United States Patent
Kong et al.

(10) Patent No.: US 12,284,040 B2
(45) Date of Patent: Apr. 22, 2025

(54) HARQ PROCESS DISABLING METHOD, RECEIVING DEVICE, AND SENDING DEVICE

(71) Applicant: Huawei Technologies Co., Ltd., Shenzhen (CN)

(72) Inventors: Chuili Kong, Hangzhou (CN); Yinggang Du, Shenzhen (CN); Rongdao Yu, Shenhen (CN); Gongzheng Zhang, Hangzhou (CN); Yunfei Qiao, Hangzhou (CN); Guijie Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/485,834

(22) Filed: Sep. 27, 2021

(65) Prior Publication Data
US 2022/0014315 A1   Jan. 13, 2022

Related U.S. Application Data

(63) Continuation of application No. PCT/CN2020/078911, filed on Mar. 12, 2020.

(30) Foreign Application Priority Data

Mar. 28, 2019   (CN) .......................... 201910244805.3

(51) Int. Cl.
*H04B 7/06*   (2006.01)
*H04L 1/1812*   (2023.01)
*H04L 5/00*   (2006.01)
*H04W 52/30*   (2009.01)
*H04W 72/23*   (2023.01)

(52) U.S. Cl.
CPC .......... *H04L 1/1812* (2013.01); *H04W 72/23* (2023.01)

(58) Field of Classification Search
None
See application file for complete search history.

(56) References Cited

U.S. PATENT DOCUMENTS 8,073,450 B2   12/2011   Jiang
8,555,125 B2   10/2013   Sahara
8,687,508 B2   4/2014   Marinier et al.
(Continued)

FOREIGN PATENT DOCUMENTS

CN   101043307 A   9/2007
CN   101529781 A   9/2009
(Continued)

OTHER PUBLICATIONS

"Consideration on HARQ Management for Non-Terrestrial Networks," Agenda Item: 7.3.2, Source: InterDigital Inc., Document for: Discussion, 3GPP TSG RAN WG1 Meeting #92, R1-1802631, Feb. 26-Mar. 2, 2018, 4 pages.
(Continued)

*Primary Examiner* — Sithu Ko
(74) *Attorney, Agent, or Firm* — Slater Matsil, LLP

(57) ABSTRACT

A hybrid automatic repeat request (HARQ) process disabling method, a receiving device, and a sending device in communication, the method including a receiving device obtaining indication data, where the indication data is used to indicate to disable a HARQ process, and the receiving device disabling the HARQ process.

17 Claims, 17 Drawing Sheets

(56) References Cited

U.S. PATENT DOCUMENTS

| | | | |
|---|---|---|---|
| 9,769,845 B2 | 9/2017 | Shao et al. | |
| 9,912,504 B2 | 3/2018 | Krzymien et al. | |
| 10,172,127 B2* | 1/2019 | Chatterjee | H04L 1/1861 |
| 10,440,771 B2 | 10/2019 | Chen et al. | |
| 10,454,623 B2* | 10/2019 | Zhang | H04L 1/1816 |
| 10,560,981 B2* | 2/2020 | Myung | H04W 80/08 |
| 11,122,553 B2* | 9/2021 | Ye | H04W 76/30 |
| 11,140,705 B2* | 10/2021 | Chang | H04W 52/58 |
| 11,317,357 B2* | 4/2022 | Papasakellariou | H04W 52/30 |
| 11,343,022 B2* | 5/2022 | Vaidya | H04L 1/1864 |
| 2007/0218907 A1 | 9/2007 | Jiang | |
| 2019/0052487 A1 | 2/2019 | Shelby et al. | |
| 2020/0052832 A1* | 2/2020 | Tian | H04L 1/1614 |
| 2020/0137803 A1* | 4/2020 | Fakoorian | H04W 74/0833 |
| 2021/0314092 A1* | 10/2021 | Wen | H04L 1/1896 |
| 2022/0007403 A1* | 1/2022 | Li | H04W 72/23 |
| 2022/0014315 A1 | 1/2022 | Kong et al. | |
| 2022/0045803 A1* | 2/2022 | Lin | H04L 1/1822 |

FOREIGN PATENT DOCUMENTS

| | | |
|---|---|---|
| CN | 101594637 A | 12/2009 |
| CN | 104094631 A | 10/2014 |
| CN | 106537979 A | 3/2017 |
| CN | 107431581 A | 12/2017 |
| CN | 111756480 B | 4/2022 |
| EP | 2388944 A1 | 11/2011 |
| RU | 2485686 C1 | 6/2013 |
| WO | 2008040710 A1 | 4/2008 |
| WO | 2014078988 A1 | 5/2014 |
| WO | WO-2019160737 A1 * | 8/2019 ........... H04L 1/1835 |

OTHER PUBLICATIONS

"Deactivating HARQ for Non-Terrestrial Networks," Agenda Item: 7.3.2, Source: InterDigital Inc., Document for: Discussion, 3GPP TSG RAN WG1 Meeting #92bis, R1-1804857, Apr. 16-20, 2018, 4 pages.

"Considerations on HARQ Management for Non-Terrestrial Networks," Agenda Item: 7.3.2, Source; InterDigital Inc., Document for: Discussion, 3GPP TSG RAN WG1 Meeting #92, R1-1802631, Athens Greece, Feb. 26-Mar. 2, 2018, 4 pages.

"3rd Generation Partnership Project; Technical Specification Group Radio Access Network; NR; Physical layer procedures for control (Release 15)," 3GPP TS 38.213 V15.5.0, Mar. 2019, 104 pages.

"3rd Generation Partnership Project; Technical Specification Group Radio Access Network; NR; Physical layer procedures for data (Release 15)," 3GPP TS 38.214 V15.5.0, Mar. 2019, 103 pages.

"NR-NTN: HARQ in Satellite Systems," Source: Fraunhofer IIS, Fraunhofer HHI, Agenda Item: 11.6.3.1 (SI NTN—MAC layer), Document for: Discussion, 3GPP TSG-RAN WG2 Meeting #104, R2-1817757, Spokane, USA, Nov. 12-16, 2018, 4 pages.

"On HARQ for NTN," Agenda Item: 11.6.3.1, Source: Ericsson, Document for: Discussion, Decision, 3GPP TSG-RAN WG2 #104, Tdoc R2-1817764, Spokane, US, Nov. 12-16, 2018, 3 pages.

"Introduction of Uplink Closed Loop Transmit Diversity for HSPA," Source to WG: Huawei, HiSilicon, Work item code HSPA_UL_TxDiv, Date: Aug. 22, 2011, Category: B, Release: Rel-11, Draft Change Request, 25.212, CR, rev 1, Current version: 10.1.0, 3GPP TSG-RAN1 Meeting #66, R1-112813, Athens, Greece, Aug. 22-26, 2011, 117 pages.

* cited by examiner

| Before interleaving | Symbol 1 | Symbol 2 | Symbol 3 | Symbol 4 | Symbol 5 | Symbol 6 | Symbol 7 | Symbol 8 |

| After interleaving | Symbol 7 | Symbol 4 | Symbol 2 | Symbol 8 | Symbol 6 | Symbol 3 | Symbol 1 | Symbol 5 |

| Before interleaving | Subframe 1 | Subframe 2 | Subframe 3 | Subframe 4 | Subframe 5 | Subframe 6 | Subframe 7 | Subframe 8 |
|---|---|---|---|---|---|---|---|---|
| After interleaving | Subframe 7 | Subframe 4 | Subframe 2 | Subframe 8 | Subframe 6 | Subframe 3 | Subframe 1 | Subframe 5 |

FIG. 16b

HARQ PROCESS DISABLING METHOD, RECEIVING DEVICE, AND SENDING DEVICE

CROSS-REFERENCE TO RELATED APPLICATIONS

This application is a continuation of International Patent Application No. PCT/CN2020/078911, filed on Mar. 12, 2020, which claims priority to Chinese Patent Application No. 201910244805.3, filed on Mar. 28, 2019. The disclosures of the aforementioned applications are hereby incorporated by reference in their entireties.

TECHNICAL FIELD

This application relates to the communications field, and in particular, to a hybrid automatic repeat request (HARQ) process disabling method, a receiving device, and a sending device.

BACKGROUND

In a new radio (NR) system, a hybrid automatic repeat request (HARQ) is used in a data transmission process. The HARQ is widely applied because the HARQ enjoys high reliability of an automatic repeat request (ARQ) manner and high efficiency of a forward error correction (FEC) manner.

However, when a HARQ mechanism is enabled, a relatively large storage space in a receiving device is occupied. In addition, more enabled HARQ processes occupy larger storage space in the receiving device. Therefore, how to prevent the HARQ process from occupying excessively large buffer space in the receiving device becomes an urgent problem to be resolved.

SUMMARY

This application provides a HARQ process disabling method, a receiving device, and a sending device, to reduce buffer space occupied by a HARQ process, improve a network throughput, and enhance system performance.

In view of this, according to a first aspect, this application provides a HARQ process disabling method, including a receiving device obtains indication data, where the indication data is used to indicate to disable a HARQ process; and the receiving device disables the HARQ process. In this embodiment of this application, the receiving device may determine, based on the indication data, to disable the HARQ process, and disable the HARQ process, that is, not to enable the HARQ process. Therefore, this may prevent the HARQ process from occupying excessively large storage space in the receiving device.

Optionally, in some possible implementations, the indication data may include a network identifier number.

That the receiving device disables the HARQ process may include the receiving device determines, based on a preset mapping relationship, that the network identifier number indicates to disable the HARQ process, and the receiving device disables the HARQ process. In this embodiment of this application, the indication data may be a network identifier number. The receiving device may determine, based on the network identifier number and the preset mapping relationship, whether the network identifier number corresponds to disabling the HARQ process. If the network identifier number indicates to disable the HARQ process, the receiving device may not enable the HARQ process. Therefore, the receiving device may be indicated to disable the HARQ process by using the network identifier number.

Optionally, in some possible implementations, the network identifier number may be a public land mobile network (PLMN) number, the PLMN number may be stored in the receiving device, and the receiving device may determine, based on the stored PLMN number, whether to disable the HARQ process. This improves efficiency of disabling the HARQ process by the receiving device.

Optionally, in some possible implementations, the indication data includes a broadcast message.

That the receiving device disables the HARQ process may include if the receiving device determines that a value of a first preset bit in the broadcast message is a first preset value, the receiving device disables the HARQ process. In this embodiment of this application, the indication data may be a broadcast message, and the broadcast message may be sent by a sending device. The value of the first preset bit in the broadcast message is the first preset value, and the first preset value is used to indicate to disable the HARQ process. Therefore, the receiving device may determine, by using the broadcast message, to disable the HARQ process and not to enable a HARQ mechanism. This reduces storage space occupied by the HARQ process.

Optionally, in some possible implementations, the indication data includes first downlink control information (DCI).

That the receiving device disables the HARQ process may include the receiving device determines whether the first DCI meets a first preset condition; and if the first DCI meets the first preset condition, the receiving device disables the HARQ process. In this embodiment of this application, the receiving device is indicated to disable the HARQ process and not to enable the HARQ mechanism in a manner in which the first DCI meets the first preset condition. This reduces storage space occupied by the HARQ process.

Optionally, in some possible implementations, that the receiving device determines whether the first DCI meets a first preset condition may include the receiving device reads a second preset bit in the first DCI; and if the receiving device determines that the second preset bit is a second preset value, the receiving device determines that the first DCI meets the first preset condition. In addition, the second preset bit may be an existing bit in the first DCI, or may be a bit added to the first DCI. The second preset bit may be determined based on a specific application scenario. In this embodiment of this application, the first preset condition may be that a value of the second preset bit in the first DCI is the second preset value. The second preset value may be used to indicate to disable the HARQ process. Therefore, when obtaining the first DCI, the receiving device may determine to disable the HARQ process and not to enable the HARQ mechanism based on a fact that the value of the second preset bit in the first DCI is the second preset value. This reduces storage space occupied by the HARQ process.

Optionally, in some possible implementations, that the receiving device determines whether the first DCI meets a first preset condition may include the receiving device obtains a field length corresponding to the HARQ process in the first DCI; and if the field length is a preset length, the receiving device determines that the first DCI meets the first preset condition. In this embodiment of this application, the first preset condition may be that the field length corresponding to the HARQ process in the first DCI is the preset length. Therefore, when receiving the first DCI, the receiving device may determine that the first DCI indicates to disable the HARQ process and not to enable the HARQ mechanism, if the field length corresponding to the HARQ process in the first DCI is the preset length. This reduces storage space occupied by the HARQ process.

Optionally, in some possible implementations, the indication data may include cyclic redundancy check (CRC) data.

That the receiving device disables the HARQ process may include the receiving device descrambles the CRC data based on a random access radio network temporary identifier (RA-RNTI), to obtain a descrambling result; and if the descrambling result is that descrambling succeeds, the receiving device disables the HARQ process. In this embodiment of this application, the indication data may be cyclic redundancy check (CRC) data. The CRC data may be CRC of any message, or may be CRC of a specified message. The CRC data may be determined based on a specific actual application scenario. When receiving the CRC data, the receiving device may descramble the CRC data by using the RA-RNTI, and determine, based on the descrambling result, whether to disable the HARQ process. When the descrambling result is that descrambling succeeds, it may be determined to disable the HARQ process and not to enable the HARQ mechanism. This reduces storage space occupied by the HARQ process.

Optionally, in some possible implementations, that the receiving device descrambles the CRC data based on an RA-RNTI, to obtain a descrambling result may include the receiving device descrambles data of a third preset bit in the CRC data by using the RA-RNTI, to obtain the descrambling result. In this embodiment of this application, optionally, in some possible implementations, that the receiving device descrambles the CRC data based on a random access radio network temporary identifier (RA-RNTI), to obtain a descrambling result may include the receiving device processes the RA-RNTI, to obtain offset data; and the receiving device descrambles the CRC data based on the offset data, to obtain the descrambling result. In this embodiment of this application, the RA-RNTI may be processed to obtain the offset data, and the CRC data is descrambled by using the offset data. Therefore, in this embodiment of this application, the RA-RNTI may be processed to obtain the offset data, and then the CRC data is descrambled by using the offset data.

Optionally, in some possible implementations, that the receiving device processes the RA-RNTI, to obtain offset data may include the receiving device adjusts a sequence of the RA-RNTI according to a preset rule, to obtain the offset data; or the receiving device adds a preset offset value to the RA-RNTI, to obtain the offset data. In this embodiment of this application, the offset data may be obtained in a plurality of manners. For example, the offset data may be obtained by adjusting the sequence of the RA-RNTI according to the preset rule, or by adding the preset offset value to the RA-RNTI. In this embodiment of this application, the RA-RNTI may be processed to obtain the offset data, and then the CRC data is descrambled by using the offset data.

Optionally, in some possible implementations, after the receiving device disables the HARQ process, the method may further include the receiving device receives second DCI, where a fourth preset bit related to the HARQ process in the second DCI is used to transmit reused data after the HARQ process is disabled, and the fourth preset bit is a vacated bit after the HARQ process is disabled. In this embodiment of this application, after the HARQ process is disabled, the fourth preset bit corresponding to the HARQ process in the second DCI may be used as a bit of the reused data. Therefore, after the HARQ process is disabled, the fourth preset bit corresponding to the HARQ process in the second DCI may be reused, and the reused data is added to the second DCI. This may implement data reusing and save network resources.

Optionally, in some possible implementations, the reused data may include at least one of over-the-top time of a satellite corresponding to the receiving device, a power adjustment step, an interleaving depth, and interruption duration of the satellite corresponding to the receiving device. In this embodiment of this application, one or more of the over-the-top time of the satellite corresponding to the receiving device, the power adjustment step, the interleaving depth, and the interruption duration of the satellite corresponding to the receiving device may be reused in the second DCI without being sent to the receiving device separately. This improves network resource utilization.

Optionally, in some possible implementations, after the receiving device disables the HARQ process, the method may further include the receiving device performs data transmission by using an ARQ. In this embodiment of this application, after it is determined that the HARQ process is disabled, an ARQ mechanism may be used to perform data transmission. When received data fails to be demodulated or decoded, retransmission information may be fed back to the sending device. In addition, the data that fails to be demodulated or decoded does not need to be stored, and excessively large storage space is not required.

According to a second aspect, this application provides a HARQ process disabling method, including a sending device obtains HARQ process information corresponding to a receiving device; and the sending device sends indication data to the receiving device, if the sending device determines that the HARQ process information meets a second preset condition, where the indication data is used to indicate the receiving device to disable a HARQ process. In this embodiment of this application, after obtaining the HARQ process information corresponding to the receiving device, the sending device may generate the indication data indicating to disable the HARQ process, and send the indication data to the receiving device, if the sending device determines that the HARQ process information meets the second preset condition, so that the receiving device determines to disable the HARQ process by using the indication data, and not to enable a HARQ mechanism to perform data transmission. Therefore, this may prevent the HARQ process from occupying excessively large storage space.

Optionally, in some possible implementations, that the sending device sends indication data to the receiving device, if the sending device determines that the HARQ process information meets a preset condition may include the sending device determines that the HARQ process information meets the second preset condition, if the sending device determines that a quantity of HARQ processes is greater than a threshold; and the sending device sends the indication data to the receiving device. In this embodiment of this application, the second preset condition may be that the quantity of HARQ processes is greater than the threshold. If the quantity of HARQ processes is greater than the threshold, it may be determined that storage space occupied by the HARQ process is relatively large. Therefore, the sending device may determine to disable the HARQ process, and not to enable the HARQ mechanism to perform data transmission. This may prevent the HARQ process from occupying excessively large storage space in the receiving device.

Optionally, in some possible implementations, the indication data is a broadcast message, and that the sending device sends the indication data to the receiving device may include the sending device generates the broadcast message, where a value of a first preset bit in the broadcast message is a first preset value, and the first preset value is used to indicate the receiving device to disable the HARQ process. In this embodiment of this application, the sending device may indicate, by using the broadcast message, the receiving device to disable the HARQ process.

Optionally, in some possible implementations, the indication data may include first DCI. In this embodiment of this application, the sending device may indicate, by using the DCI, the receiving device to disable the HARQ process.

Optionally, in some possible implementations, that the sending device sends the indication data to the receiving device may include the sending device sends the first DCI to the receiving device, where a value of a second preset bit in the first DCI is a second preset value, and the second preset value is used to indicate the receiving device to disable the HARQ process. In this embodiment of this application, if the value of the second preset bit in the first DCI is the second preset value, it indicates to disable the HARQ process, so that the receiving device may determine to disable the HARQ process based on the value of the second preset bit in the first DCI. This prevents the HARQ process from occupying excessively large storage space.

Optionally, in some possible implementations, that the sending device sends the indication data to the receiving device may include the sending device sends the first DCI to the receiving device, where a field length corresponding to the HARQ process in the first DCI is a preset length, and the preset length is used to indicate the receiving device to disable the HARQ process. In this embodiment of this application, the field length corresponding to the HARQ process in the first DCI may be used to indicate whether to disable the HARQ process, so that when receiving the first DCI, the receiving device determines, based on a fact that the field length corresponding to the HARQ process in the first DCI is the preset length, to disable the HARQ process. This prevents the HARQ process from occupying excessively large storage space.

Optionally, in some possible implementations, that the sending device sends the indication data to the receiving device may include the sending device scrambles CRC data by using an RA-RNTI, to obtain scrambled CRC data; and the sending device sends the scrambled CRC data to the receiving device. In this embodiment of this application, the sending device may scramble the CRC data by using the RA-RNTI, to obtain the scrambled CRC data, where the scrambled CRC data may be used to indicate whether to disable the HARQ process. After receiving the scrambled CRC data, the receiving device may descramble the CRC data, to determine to disable the HARQ process. This prevents the HARQ process from occupying excessively large storage space.

Optionally, in some possible implementations, that the sending device scrambles CRC data by using an RA-RNTI, to obtain scrambled CRC data may include the sending device scrambles data of a third preset bit in the CRC data by using the RA-RNTI, to obtain the scrambled CRC data. In this embodiment of this application, there are a plurality of manners to scramble the CRC data. The data of the third preset bit in the CRC data may be scrambled by using the RA-RNTI, to obtain the scrambled data. After receiving the scrambled CRC data, the receiving device may descramble the data of the third preset bit in the CRC data, and determine to disable the HARQ process, if the descrambling succeeds. This prevents the HARQ process from occupying excessively large storage space.

Optionally, in some possible implementations, that the sending device scrambles CRC data by using an RA-RNTI, to obtain scrambled CRC data may include the sending device processes the RA-RNTI, to obtain offset data; and the sending device scrambles the CRC data based on the offset data, to obtain the scrambled CRC data. In this embodiment of this application, the RA-RNTI may be processed to obtain the offset data, and the CRC data is scrambled by using the offset data.

Optionally, in some possible implementations, that the sending device processes the RA-RNTI, to obtain offset data may include the sending device adjusts a sequence of the RA-RNTI according to a preset rule, to obtain the offset data; or the sending device adds a preset offset value to the RA-RNTI, to obtain the offset data; or the sending device maps the RA-RNTI according to a preset mapping rule, to obtain the offset data. Therefore, in this embodiment of this application, the RA-RNTI may be processed in a plurality of manners, to obtain the offset data. The obtained offset data may be more secure, and security of scrambling the CRC may be improved.

Optionally, in some possible implementations, after the sending device sends the indication data to the receiving device, the method may further include the sending device generates second DCI based on reused data, where a fourth preset bit corresponding to the HARQ process in the second DCI is used to transmit the reused data after the HARQ process is disabled. In this embodiment of this application, the sending device may reuse the second DCI, and the fourth preset bit related to the HARQ process in the second DCI may be used to transmit the reused data after the HARQ process is disabled. This may improve network resource utilization.

Optionally, in some possible implementations, the reused data may include at least one of over-the-top time of a satellite corresponding to the receiving device, a power adjustment step, an interleaving depth, and interruption duration of the satellite corresponding to the receiving device.

According to a third aspect, this application provides a receiving device, including a transceiver unit and a processing unit.

The transceiver unit is used by the receiving device to obtain indication data, where the indication data is used to indicate to disable a HARQ process.

The processing unit is configured to disable the HARQ process.

Optionally, in some possible implementations, the indication data includes a network identifier number.

The processing unit is configured to determine, based on a preset mapping relationship, that the network identifier number indicates to disable the HARQ process, and the receiving device disables the HARQ process.

Optionally, in some possible implementations, the indication data includes a broadcast message.

The processing unit is configured to if a value of a first preset bit in the broadcast message is a first preset value, disable the HARQ process.

Optionally, in some possible implementations, the indication data includes first downlink control information DCI.

The processing unit is configured to determine whether the first DCI meets a first preset condition; and if the first DCI meets the first preset condition, disable the HARQ process.

Optionally, in some possible implementations, the processing unit is configured to read a second preset bit in the first DCI; and if the second preset bit is determined to be a second preset value, determine that the first DCI meets the first preset condition.

Optionally, in some possible implementations, the processing unit is configured to obtain a field length corresponding to the HARQ process in the first DCI; and if the field length is a preset length, determine that the first DCI meets the first preset condition.

Optionally, in some possible implementations, the indication data includes cyclic redundancy check CRC data.

The processing unit is configured to descramble the CRC data based on a random access radio network temporary identifier RA-RNTI, to obtain a descrambling result; and if the descrambling result is that descrambling succeeds, disable the HARQ process.

Optionally, in some possible implementations, the processing unit is configured to descramble data of a third preset bit in the CRC data by using the RA-RNTI, to obtain the descrambling result.

Optionally, in some possible implementations, the processing unit is configured to process the RA-RNTI, to obtain offset data; and descramble the CRC data based on the offset data, to obtain the descrambling result.

Optionally, in some possible implementations, the processing unit is configured to adjust a sequence of the RA-RNTI according to a preset rule, to obtain the offset data; add a preset offset value to the RA-RNTI, to obtain the offset data; or map the RA-RNTI according to a preset mapping rule, to obtain the offset data.

Optionally, in some possible implementations, after the processing unit disables the HARQ process, the transceiver unit is further configured to receive second DCI, where a fourth preset bit related to the HARQ process in the second DCI is used to transmit reused data after the HARQ process is disabled, and the fourth preset bit is a vacated bit after the HARQ process is disabled.

Optionally, in some possible implementations, the reused data includes at least one of over-the-top time of a satellite corresponding to the receiving device, a power adjustment step, an interleaving depth, and interruption duration of the satellite corresponding to the receiving device.

Optionally, in some possible implementations, after the processing unit disables the HARQ process, the transceiver unit is further configured to perform data transmission by using an automatic repeat request ARQ.

According to a fourth aspect, this application provides a sending device, including a processing unit, configured to obtain HARQ process information corresponding to a receiving device; and a transceiver unit, configured to send indication data to the receiving device, if the sending device determines that the HARQ process information meets a second preset condition, where the indication data is used to indicate the receiving device to disable a HARQ process.

Optionally, in some possible implementations, the processing unit is further configured to determine that the HARQ process information meets the second preset condition, if the sending device determines that a quantity of HARQ processes is greater than a threshold; and the transceiver unit is configured to send the indication data to the receiving device.

Optionally, in some possible implementations, the indication data is a broadcast message, and the transceiver unit is configured to send the broadcast message to the receiving device, where a value of a first preset bit in the broadcast message is a first preset value, and the first preset value is used to indicate the receiving device to disable the HARQ process.

Optionally, in some possible implementations, the indication data is first DCI.

Optionally, in some possible implementations, the transceiver unit is configured to send the first DCI to the receiving device, where a value of a second preset bit in the first DCI is a second preset value, and the second preset value is used to indicate the receiving device to disable the HARQ process.

Optionally, in some possible implementations, the transceiver unit is configured to send the first DCI to the receiving device, where a field length corresponding to the HARQ process in the first DCI is a preset length, and the preset length is used to indicate the receiving device to disable the HARQ process.

Optionally, in some possible implementations, the processing unit is further configured to scramble CRC data by using an RA-RNTI, to obtain scrambled CRC data; and the transceiver unit is configured to send the scrambled CRC data to the receiving device.

Optionally, in some possible implementations, the processing unit is configured to scramble data of a third preset bit in the CRC data by using the RA-RNTI, to obtain the scrambled CRC data.

Optionally, in some possible implementations, the processing unit is configured to process the RA-RNTI, to obtain offset data; and scramble the CRC data based on the offset data, to obtain the scrambled CRC data.

Optionally, in some possible implementations, the processing unit is configured to adjust a sequence of the RA-RNTI according to a preset rule, to obtain the offset data; add a preset offset value to the RA-RNTI, to obtain the offset data; or map the RA-RNTI according to a preset mapping rule, to obtain the offset data.

Optionally, in some possible implementations, the processing unit is further configured to generate second DCI based on reused data after the transceiver unit sends the indication data to the receiving device, where a fourth preset bit in the second DCI is reused data, and the fourth preset bit is a vacated bit after the HARQ process is disabled; and the transceiver unit is further configured to send the second DCI to the receiving device.

Optionally, in some possible implementations, the reused data may include at least one of over-the-top time of a satellite corresponding to the receiving device, a power adjustment step, an interleaving depth, and interruption duration of the satellite corresponding to the receiving device.

According to a fifth aspect, an embodiment of this application provides a receiving device, including a processor, a memory, and an input/output interface, where the processor and the memory are connected to the input/output interface, the memory is configured to store program code, and when invoking the program code in the memory, the processor performs the steps of the method in the first aspect or any implementation of the first aspect of this application.

According to a sixth aspect, an embodiment of this application provides a sending device, including a processor, a memory, and an input/output interface, where the processor and the memory are connected to the input/output interface, the memory is configured to store program code, and when invoking the program code in the memory, the processor performs the steps of the method in the second aspect or any implementation of the second aspect of this application.

According to a seventh aspect, this application provides a chip system, used in a receiving device. The chip system includes a processor, configured to support the receiving device to implement functions in the foregoing aspects, for example, processing data and/or information in the foregoing method. In a possible design, the chip system further includes a memory, where the memory is configured to store program instructions and data that are necessary for the receiving device. The chip system may include a chip, or may include a chip and another discrete component.

The processor mentioned in any of the foregoing descriptions may be a general-purpose central processing unit (CPU), a microprocessor, an application-specific integrated circuit (ASIC), or one or more integrated circuits used to control program execution of the HARQ process disabling method in the first aspect.

According to an eighth aspect, this application provides a chip system, used in a sending device. The chip system includes a processor, configured to support the sending device to implement functions in the foregoing aspects, for example, processing data and/or information in the foregoing method. In a possible design, the chip system further includes a memory, where the memory is configured to store program instructions and data that are necessary for the sending device. The chip system may include a chip, or may include a chip and another discrete component.

The processor mentioned in any of the foregoing descriptions may be a general-purpose central processing unit (CPU), a microprocessor, an application-specific integrated circuit (ASIC), or one or more integrated circuits used to control program execution of the HARQ process disabling method in the second aspect.

According to a ninth aspect, an embodiment of this application provides a communications system, where the communications system may include a receiving device and a sending device.

The receiving device may be configured to perform the steps performed by the receiving device in the first aspect or any embodiment of the first aspect.

The sending device may be configured to perform the steps performed by the sending device in the second aspect or any embodiment of the second aspect.

According to a tenth aspect, an embodiment of this application provides a storage medium. It should be noted that technical solutions of this application essentially, or a part contributing to a current technology, or all or a part of the technical solutions may be implemented in a form of a software product. The computer software product is stored in the storage medium, and is configured to store computer software instructions used by the foregoing device. The computer software instructions include programs designed for a receiving device or a sending device for executing any one of the optional implementations of the first aspect or the second aspect.

The storage medium includes various media that may store program code, such as a USB flash drive, a removable hard disk, a read-only memory (ROM), a random access memory (RAM), a magnetic disk, or an optical disc.

According to an eleventh aspect, an embodiment of this application provides a computer program product including instructions. When the computer program product runs on a computer, the computer is enabled to perform the method in any one of the optional implementations of the first aspect or the second aspect.

In the solutions in the embodiments of this application, the receiving device may obtain the indication data, and if the receiving device determines that the indication data indicates to disable the HARQ process, the receiving device disables the HARQ process. Therefore, in the embodiments of this application, the receiving device may directly determine, based on the indication data, to disable the HARQ process. This prevents the HARQ process from occupying excessively large buffer space. In addition, after the HARQ process is disabled, subsequent data related to the HARQ process may be reused. This improves transmitted data utilization, saves network resources, and enhances system performance.

BRIEF DESCRIPTION OF THE DRAWINGS

FIG. 16b is a schematic diagram of another interleaving manner in a HARQ process disabling method according to this application;

DETAILED DESCRIPTION OF ILLUSTRATIVE EMBODIMENTS

This application provides a HARQ process disabling method, a receiving device, and a sending device, to reduce buffer space occupied by a HARQ process, improve a network throughput, and enhance system performance.

Figure 1A:
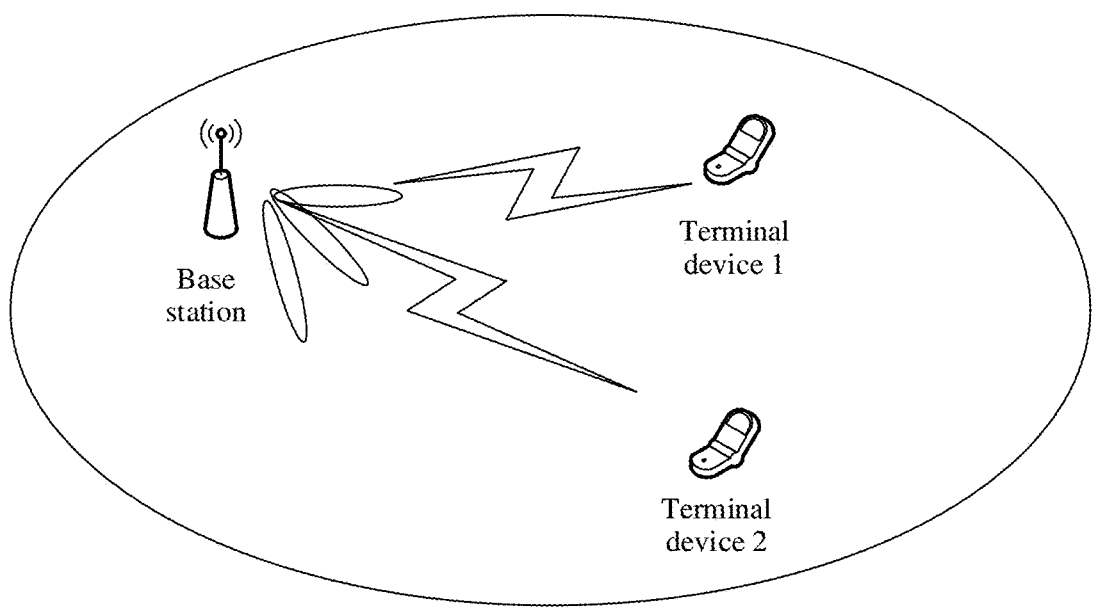
FIG. 1a is a schematic diagram of an application scenario according to an embodiment of this application.
Figure 1B:
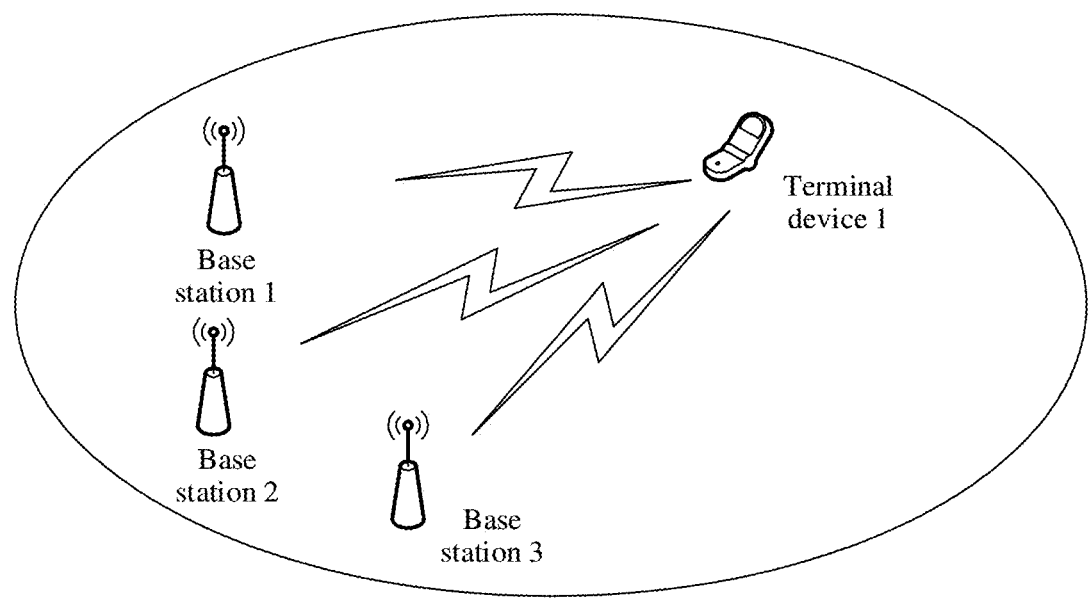
FIG. 1b is a schematic diagram of another application scenario according to an embodiment of this application.

The HARQ process disabling method in this application may be applied to a scenario including a plurality of network devices. One receiving device may be connected to one or more sending devices, and one sending device may be connected to one or more receiving devices. For example, the sending device in this application may be a base station, and the receiving device may be a terminal device. One terminal device may be connected to one or more base stations, and one base station may be connected to one or more terminal devices. For example, a specific scenario of the HARQ process disabling method in this embodiment of this application may be shown in FIG. 1*a* and FIG. 1*b*. As shown in FIG. 1*a*, one base station may be connected to one or more terminal devices (a terminal device 1 and a terminal device 2 in FIG. 1*a*). As shown in FIG. 1*b*, one terminal device may be connected to one or more base stations (a base station 1, a base station 2, and a base station 3 in FIG. 1*b*).

More specifically, the sending device in this embodiment of this application may be a macro base station, a micro base station (which is also referred to as a small cell), a relay station, an access point, or the like in various forms. In different communications systems, names of sending devices may be different. For example, the sending device may be a global system for mobile communications (GSM), a base transceiver station (BTS) in a code division multiple access (CDMA) network, an NB (NodeB) in wideband code division multiple access (WCDMA), or a long term evolutional NodeB (eNB or eNodeB) in a long term evolution (LTE) system. Alternatively, the sending device may be a radio controller in a cloud radio access network (CRAN) scenario. Alternatively, the sending device may be a base station device, for example, a 5G NodeB (gNB) in a 5G network or a network device in a future evolved public land mobile network (PLMN). Alternatively, the sending device may be a wearable device or a vehicle-mounted device. Alternatively, the sending device may be a transmission reception point (TRP) or the like.

The receiving device in this embodiment of this application may be a terminal device. The terminal device may be a handheld device with a communication function, a wearable device, a computing device, another processing device connected to a wireless modem, or the like. For example, the terminal device may be a mobile station (MS), a subscriber unit, a cellular phone, a smartphone, a wireless data card, a personal digital assistant (PDA) computer, a tablet computer, a wireless modem, a handheld device, a laptop computer, a machine type communication (MTC) terminal, or the like.

Figure 2:
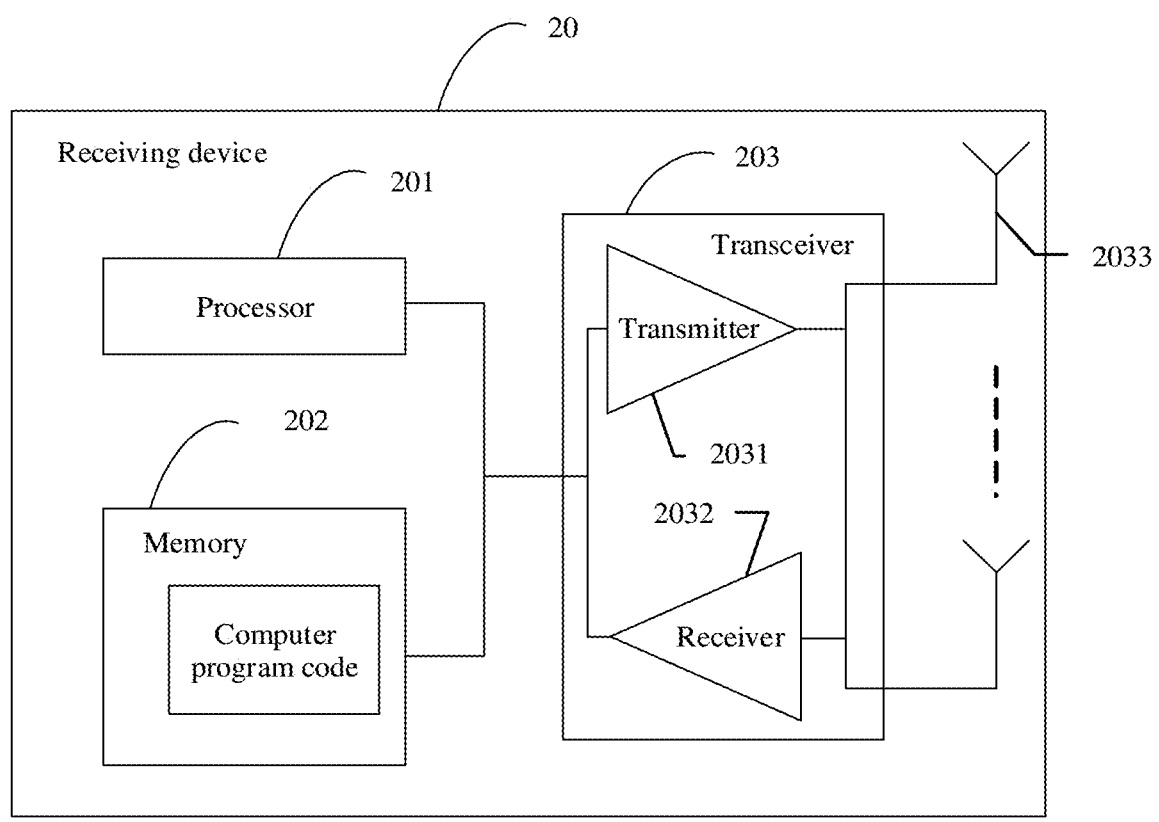
FIG. 2 is a schematic structural diagram of a receiving device according to this application.

For example, a structure of a receiving device in this embodiment of this application may be shown in FIG. 2. A receiving device 20 includes a processor 201, a memory 202, and a transceiver 203. The transceiver 203 may include a transmitter 2031, a receiver 2032, and an antenna 2033. The memory 202 may be configured to store data or instructions. The processor 201 may be configured to execute the instructions stored in the memory 202, or perform steps of a HARQ process disabling method performed by the receiving device in this embodiment of this application. The receiver 2032 may be configured to receive, by using the antenna 2033, data sent by a sending device, and the transmitter 2031 may be configured to send data to the sending device by using the antenna 2033.

Figure 3:
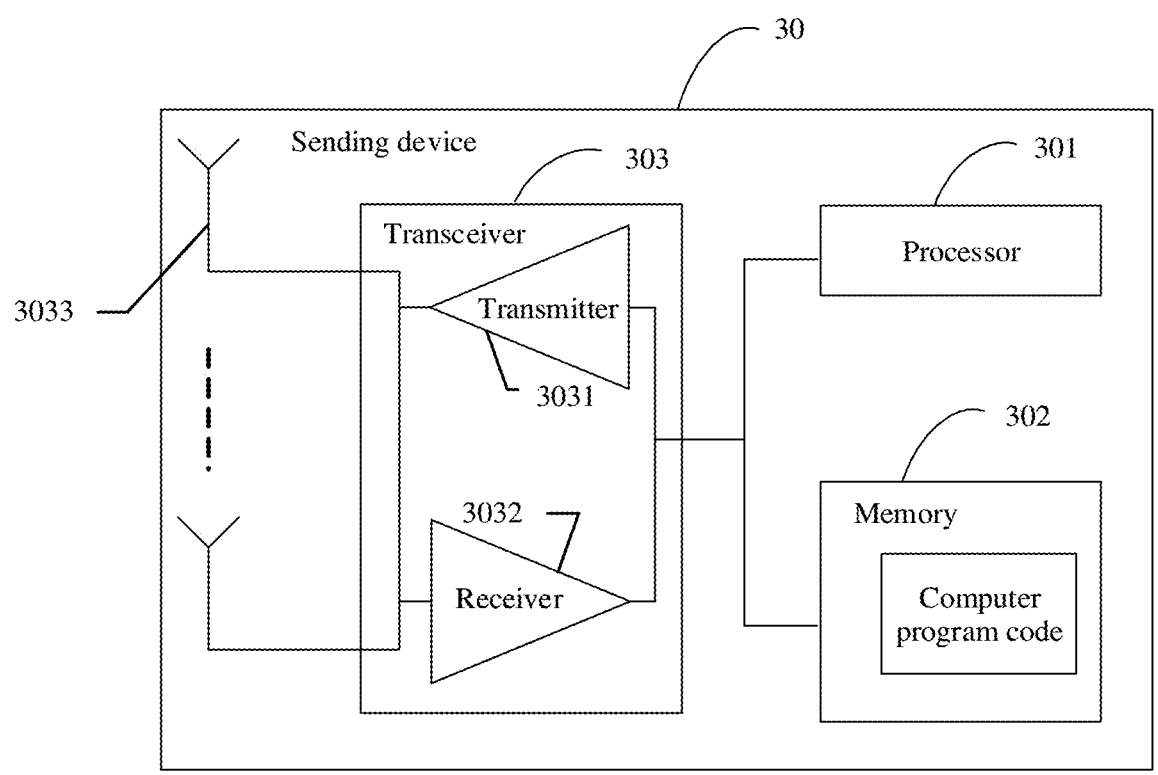
FIG. 3 is a schematic structural diagram of a sending device according to this application.

For example, a structure of a sending device in this embodiment of this application may be shown in FIG. 3. A sending device 30 may include a processor 301, a memory 302, and a transceiver 303. The transceiver 303 includes a transmitter 3031, a receiver 3032, and an antenna 3033. The memory 302 may be configured to store data or instructions. The processor 301 may be configured to execute the instructions stored in the memory 302, or perform steps of a HARQ process disabling method performed by the receiving device in this embodiment of this application. The transmitter 3031 may be configured to send data to a receiving device by using the antenna 3033, and the receiver 3032 may be configured to receive, by using the antenna 3033, data sent by the receiving device.

In addition, when the receiving device is a terminal device, the terminal device may be a mobile phone, a tablet computer, a laptop computer, a television, a smart wear, another electronic device with a display, or the like. A specific form of the terminal is not limited in this embodiment of this application. A system that may be installed on the terminal may include iOS®, Android®, Microsoft®, Linux®, another operating system, or the like. This is not limited in this embodiment of this application.

Figure 4:
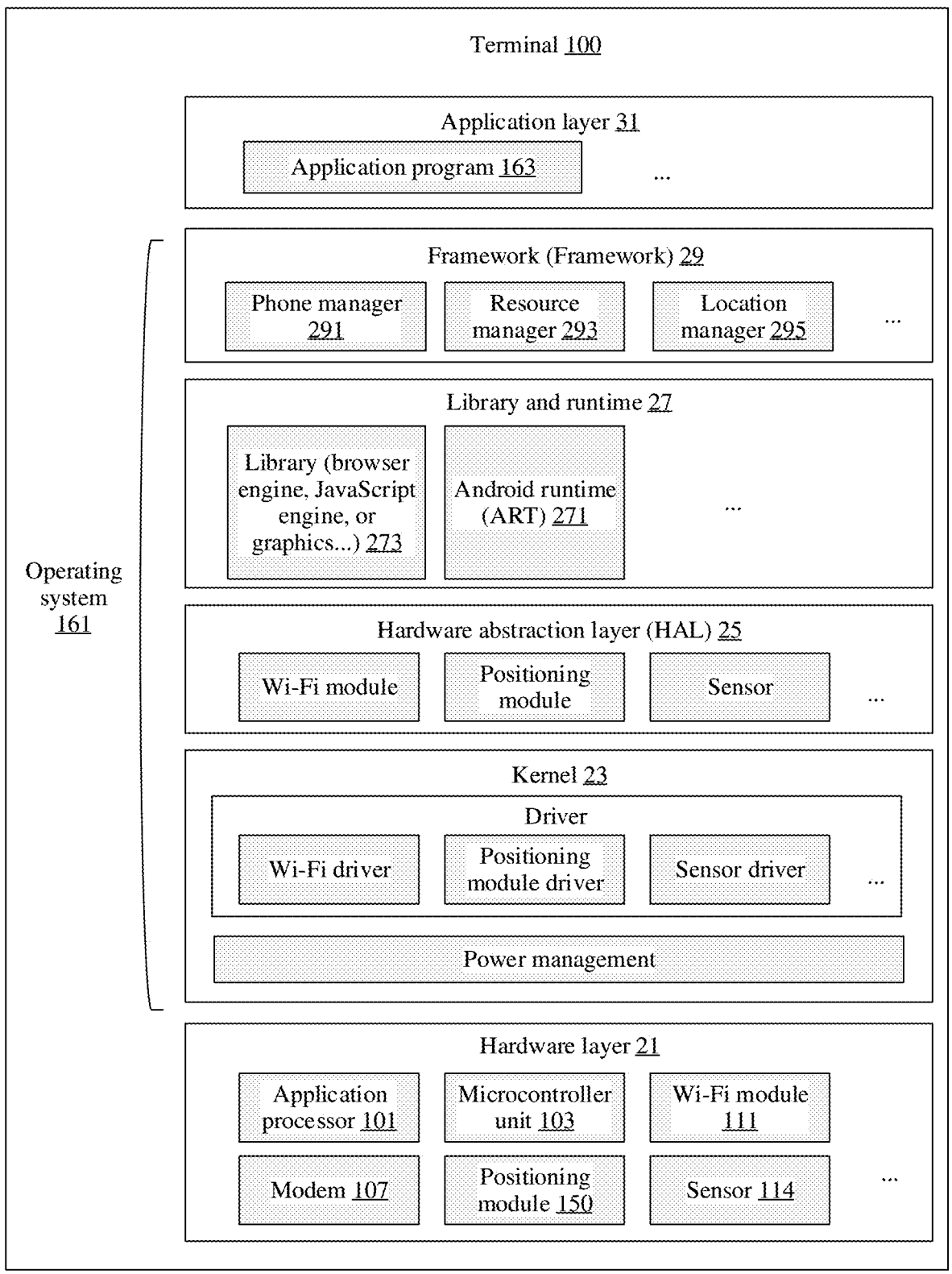
FIG. 4 is a schematic structural diagram of another receiving device according to this application.

For example, a terminal 100 installing the Android® operating system is used as an example. As shown in FIG. 4, the terminal 100 may be logically divided into a hardware layer 21, an operating system 161, and an application layer 31. The hardware layer 21 includes hardware resources such as an application processor 101, a microcontroller unit 103, a modem 107, a Wi-Fi module 111, a sensor 114, a positioning module 150, and a memory 105. The application layer 31 includes one or more application programs, for example, an application program 163. The application program 163 may be any type of application program, for example, a social application, an e-commerce application, or a browser. The operating system 161 is used as software middleware between the hardware layer 21 and the application layer 31, and is a computer program for managing and controlling hardware and software resources.

In an embodiment, the operating system 161 includes a kernel 23, a hardware abstraction layer (HAL) 25, library and runtime 27, and a framework 29. The kernel 23 is configured to provide an underlying system component and a service, for example, power management, memory management, thread management, or a hardware driver. The hardware driver includes a Wi-Fi driver, a sensor driver, a positioning module driver, and the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The library and runtime 27 is also referred to as a runtime library, and provides a library file and an execution environment required by an executable program during running. The library and runtime 27 includes Android runtime (ART) 271, a library 273, and the like. The ART 271 is a virtual machine or a virtual machine instance that can convert bytecode of an application program into machine code. The library 273 is a program library that provides support for the executable program during running, and includes a browser engine (for example, webkit), a script execution engine (for example, a JavaScript engine), a graphics processing engine, and the like.

The framework 29 is configured to provide various basic common components and services, such as window management and location management, for an application program at the application layer 31. The framework 29 may include a phone manager 291, a resource manager 293, a location manager 295, and the like.

All functions of components in the operating system 161 described above may be implemented by the application processor 101 by executing programs stored in the memory 105.

A person skilled in the art may understand that the terminal 100 may include fewer or more components than those shown in FIG. 4. The terminal shown in FIG. 4 includes only components more related to a plurality of implementations disclosed in this embodiment of this application.

The terminal usually supports installation of a plurality of application programs (APP), such as a word processing application program, a phone application program, an email application program, an instant messaging application program, a photo management application program, a network browsing application program, a digital music player application program, and/or a digital video player application program.

The foregoing describes structures of the receiving device and the sending device in this application. The following describes a HARQ process disabling method in the embodiments of this application based on the receiving device or the sending device in FIG. 2 to FIG. 4.

Figure 5:
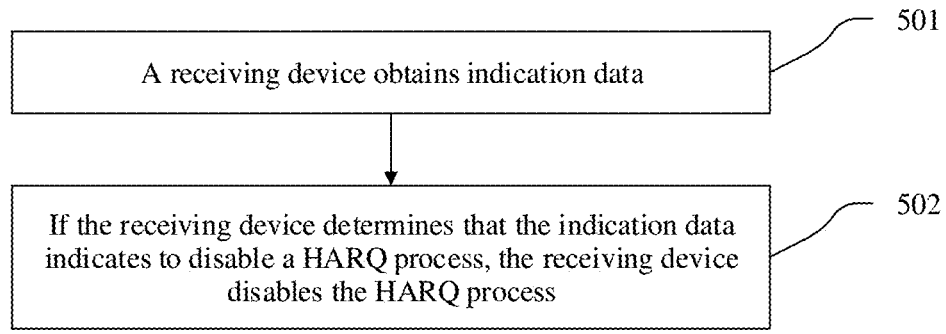
FIG. 5 is a schematic flowchart of a HARQ process disabling method according to this application.

First, FIG. 5 is a schematic flowchart of a HARQ process disabling method according to an embodiment of this application. The method may include the following steps.

501: A receiving device obtains indication data.

First, the receiving device obtains the indication data, where the indication data is used to indicate whether to disable a HARQ process. The indication data may be sent by a sending device, or may be stored in the receiving device.

The indication data may include at least one of a network identifier number, first downlink control information (DCI), or a broadcast message. The network identifier may be a network identifier corresponding to the receiving device. For example, if the receiving device is a mobile phone, the network identifier may be a subscriber identity module (SIM) card of the mobile phone, a public land mobile network (PLMN) number corresponding to a SIM card, or may be a network identifier allocated to the receiving device. The first DCI may be generated and sent by the sending device. The broadcast message may be a message broadcast by the sending device to all receiving devices that access the sending device. In addition, in this application, the indication data may be a type of data, for example, a broadcast message or DCI, or may be at least two pieces of data combined to indicate the receiving device to disable the HARQ process. For example, the broadcast message and the first DCI may simultaneously indicate the receiving device to disable the HARQ process, and only after receiving the broadcast message and the first DCI, the receiving device determines to disable the HARQ process. This improves transmission reliability.

In addition, if the indication data is stored in the receiving device, the receiving device may directly read the indication data. If the indication data is sent by the sending device, before the receiving device receives the indication data, the sending device further needs to determine whether to disable the HARQ process. After the receiving device accesses the sending device, the sending device may determine whether to disable the HARQ process. Usually, the sending device may obtain HARQ process information corresponding to the receiving device. The sending device may obtain data related to the receiving device from the sending device or from a server, and then obtain the HARQ process information of the receiving device from the data related to the receiving device. The HARQ process information may include a quantity of HARQ processes, a time domain resource or a frequency domain resource corresponding to each HARQ process, and the like. After obtaining the HARQ process information corresponding to the receiving device, the sending device determines whether the HARQ process information meets a second preset condition. If the HARQ process information meets the second preset condition, the sending device may determine to disable the HARQ process, that is, not to enable a HARQ mechanism, and send, to the receiving device, the indication data indicating to disable the HARQ process. After receiving the indication data, the receiving device may determine, based on the indication data, whether to disable the HARQ process, or not to enable the HARQ process if the HARQ process is not enabled. Therefore, when the indication data is stored in the receiving device, the receiving device may directly determine, based on the indication data stored in the receiving device, whether to disable the HARQ process. This prevents the HARQ process from occupying excessively large storage space. If the indication data is sent by the sending device, the sending device may determine, based on an actual situation of the receiving device, whether to disable the HARQ process. This may implement dynamic adjustment of a HARQ of the receiving device, and prevent the HARQ process from occupying excessively large storage space in the receiving device.

In a specific application scenario, in a HARQ with soft combination, a data packet that is incorrectly received is stored in a buffer memory, and is combined with a subsequently retransmitted data packet to obtain a combined data packet, and then a decoding operation by using error correction code is performed on the combined data packet. If the decoding operation fails, retransmission is requested. Decoding a combined packet is more reliable than decoding only retransmitted data. However, when the HARQ mechanism is used, buffer space is required to store a data packet that is incorrectly received, and perform subsequent soft combination and decoding. Generally, a size of the buffer space is related to the quantity of HARQ processes, and a larger quantity of HARQ processes indicates larger required buffer space. For example, in an NR system, a quantity of supported HARQ processes is 16, and in a non-terrestrial network (NTN) system, a quantity of supported HARQ processes is larger. For another example, for the geostationary orbit (GEO), to make data occupy an entire air interface, when an SCS is equal to 15 kHz, a quantity of required HARQ processes is about 560, which is 35 times that of the NR system, and required storage space is also 35 times that of the NR system. Therefore, this occupies larger storage space in the receiving device. Therefore, in this embodiment of this application, the receiving device may disable the HARQ process based on the indication data. This prevents the HARQ process from occupying excessively large storage space in the receiving device.

502: If the receiving device determines that the indication data indicates to disable the HARQ process, the receiving device disables the HARQ process.

After obtaining the indication data, the receiving device determines, according to a preset rule, whether the indication data indicates to disable the HARQ process. If the receiving device determines that the indication data indicates to disable the HARQ process, the receiving device disables the HARQ process.

The receiving device may determine, based on a preset correspondence, whether the indication data indicates to disable the HARQ process. If the indication data indicates to disable the HARQ process, the receiving device may disable the HARQ process, and not enable the HARQ mechanism.

It should be noted that the receiving device in this embodiment or the following embodiments of this application disables the HARQ process, that is, does not enable the HARQ mechanism. For example, when accessing a network, the receiving device may determine to disable the HARQ process, and when performing data transmission, the receiving device may perform data transmission only once without performing retransmission.

In addition, in an optional implementation of this application, after receiving the indication data, the receiving device may determine to disable the HARQ process, and not need to read specific content of the indication data. For example, if the sending device and the receiving device have agreed on a rule, in any pre-agreed SIB or between a SIB 1 and a SIB 2, provided that the receiving device receives the indication data, the receiving device may determine to disable the HARQ process without reading specific content of the indication data. This improves efficiency of disabling the HARQ process by the receiving device.

Optionally, in another implementation, the receiving device may further clearly determine, based on the indication data, whether to disable the HARQ process. The receiving device may disable the HARQ process based on the indication data. This prevents the HARQ process from occupying excessively large buffer space. In addition, optionally, after the HARQ process is disabled, subsequent data related to the HARQ process may be reused. This improves transmitted data utilization, saves network resources, and enhances system performance.

In this application, the indication data may be data in a plurality of scenarios, for example, data stored in the receiving device, or data sent by the sending device. The following describes the different scenarios.

Figure 6:
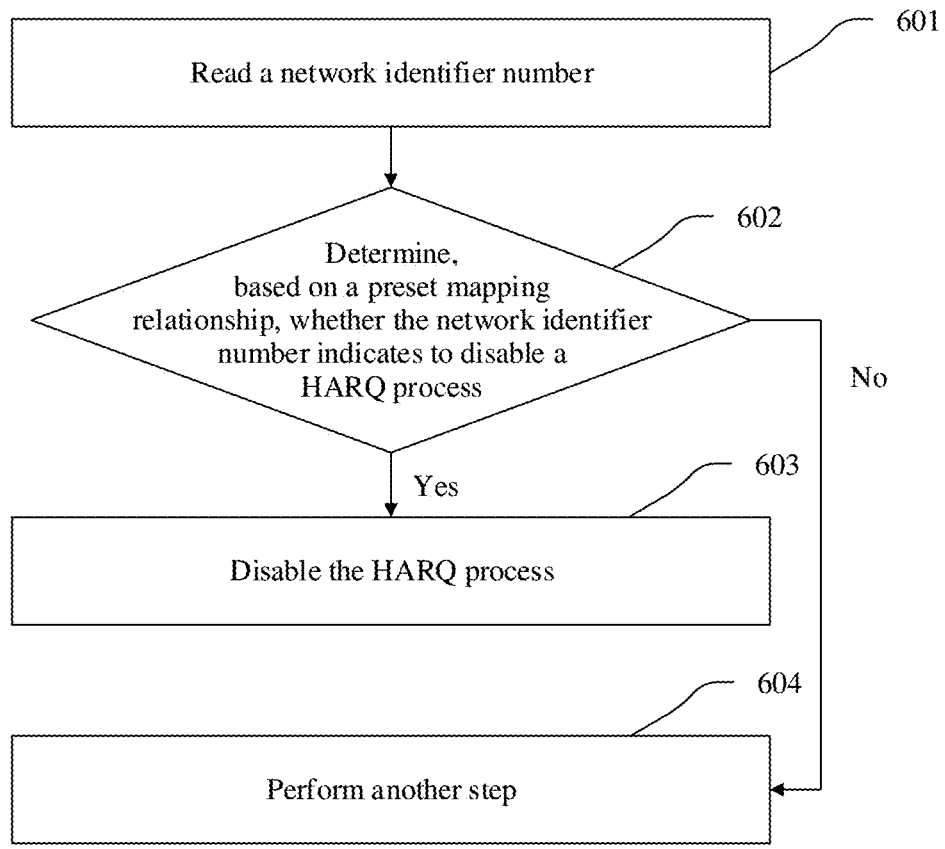
FIG. 6 is a schematic flowchart of another HARQ process disabling method according to this application.

First, when the indication data is a network identifier number, a specific schematic flowchart may be shown in FIG. 6, and may include the following steps.

601: Read a network identifier number.

A receiving device reads the network identifier number, where the network identifier number may be an identifier number allocated to the receiving device, a PLMN number stored in a SIM card of the receiving device, a PLMN number received by the receiving device, or the like.

For example, before accessing a network, the receiving device first performs network searching, and may select, based on operator-related data stored in the SIM card, a network to access. Each operator may correspond to a different PLMN number or another network identifier number, and the receiving device may determine, based on a PLMN number of an accessible satellite or another network identifier number sent by a device of the operator, whether to disable a HARQ process.

602: Determine, based on a preset mapping relationship, whether the network identifier number indicates to disable the HARQ process, and if the network identifier number indicates to disable the HARQ process, perform step 603, or if the network identifier number indicates not to disable the HARQ process, perform step 604.

After obtaining the network identifier number, the receiving device may determine, based on the network identifier number and the preset mapping relationship, whether the network identifier number indicates to disable the HARQ process. If the receiving device determines that the network identifier number indicates to disable the HARQ process, the receiving device disables the HARQ process, that is, performs step 603. If the network identifier number indicates not to disable the HARQ process, the receiving device performs another step, that is, performs step 604. The preset mapping relationship may be set in advance. When the network identifier number is allocated to the receiving device, the SIM card, the operator, or the like, correspondingly it may be determined whether to disable the HARQ process, and the preset mapping relationship is stored in the receiving device, so that the receiving device may determine, based on the preset mapping relationship, whether the read network identifier number indicates to disable the HARQ process.

Usually, if the receiving device includes a SIM card, the network identifier number may be a PLMN number, and the PLMN number may correspond to an operator corresponding to the SIM card. For example, a PLMN number of China Mobile includes 46000, a PLMN number of China Unicom includes 46001, and PLMN numbers of an existing satellite system include 51000, 90105, and the like. A PLMN number may further be allocated to each satellite of an operator. For example, a PLMN number may be configured for each of a geostationary orbit (GEO) satellite, a medium earth orbit (MEO) satellite, or a low earth orbit (LEO) satellite. For example, if the receiving device is a mobile phone, after the mobile phone is powered on and before the mobile phone accesses a network, the mobile phone performs network searching, and may read a PLMN number stored in a SIM card. Then, the mobile phone determines, based on a preset mapping relationship, whether the PLMN number corresponds to disabling the HARQ process. Alternatively, when accessing a network, the mobile phone receives a PLMN number sent by an operator device, and determines, based on the PLMN number and a preset mapping relationship, whether to disable the HARQ process.

It should be understood that the preset mapping relationship may be set by a sending device, or may be determined by an operator. Adjustment may be performed based on an actual application scenario. This is not limited in this application.

For example, the preset mapping relationship between the network identifier number and the HARQ process may be represented by using a mapping relationship table as shown in Table 1.

TABLE 1

| PLMN number | Whether to disable a HARQ process |
|---|---|
| 46000 | No |
| 46001 | Yes |
| . . . | . . . |
| XXXXX | Yes |

After reading the PLMN number, the receiving device may search preset mapping relationships based on the PLMN number for a mapping relationship corresponding to the PLMN number. For example, if the receiving device reads that the PLMN number is 46001, the receiving device may determine, according to the mapping relationship table, that the PLMN number indicates to disable the HARQ process.

For example, in a specific application scenario, the receiving device is a terminal device, and a plurality of PLMN numbers are stored in a SIM card of the terminal device. When the terminal device is powered on and performs network searching, the terminal device receives a master information block (MIB) message. The MIB message may carry access information of a terrestrial network, or may carry access information of an NTN system, where the access information of the NTN system may include a PLMN number. When the MIB message carries the PLMN number, if the PLMN number is an accessible PLMN number stored in the terminal device, the terminal device may determine that the terminal device can access the NTN system. In this case, the terminal device may determine, based on the PLMN number and a preset mapping relationship, whether the PLMN number corresponds to disabling the HARQ process. If the PLMN number corresponds to disabling the HARQ process, the terminal device may directly determine to disable the HARQ process. In addition, if all networks that can be accessed by the terminal device are NTN systems, the terminal device may directly determine, based on a preset mapping relationship, whether to disable the HARQ process.

603: Disable the HARQ process.

After determining that the network identifier number indicates to disable the HARQ process, the receiving device keeps the HARQ process in a disabled status, that is, does not enable a HARQ mechanism.

604: Perform another step.

In addition, if the receiving device determines that the network identifier number does not indicate to disable the HARQ process, the receiving device may perform another step, for example, enabling the HARQ process, disabling the entire HARQ process or a part of the HARQ process, or enabling an ARQ mechanism after disabling the HARQ process. Adjustment may be performed based on an actual application scenario.

Therefore, in this embodiment of this application, the receiving device may read the network identifier number, and determine, based on the preset mapping relationship, whether the network identifier number indicates to disable the HARQ process, so that the receiving device may clearly determine, based on the network identifier number, whether to disable the HARQ process. This prevents the HARQ process from occupying excessively large buffer space. In addition, after the HARQ process is disabled, subsequent data related to the HARQ process may be reused. This improves transmitted data utilization, saves network resources, and enhances system performance.

Figure 7:
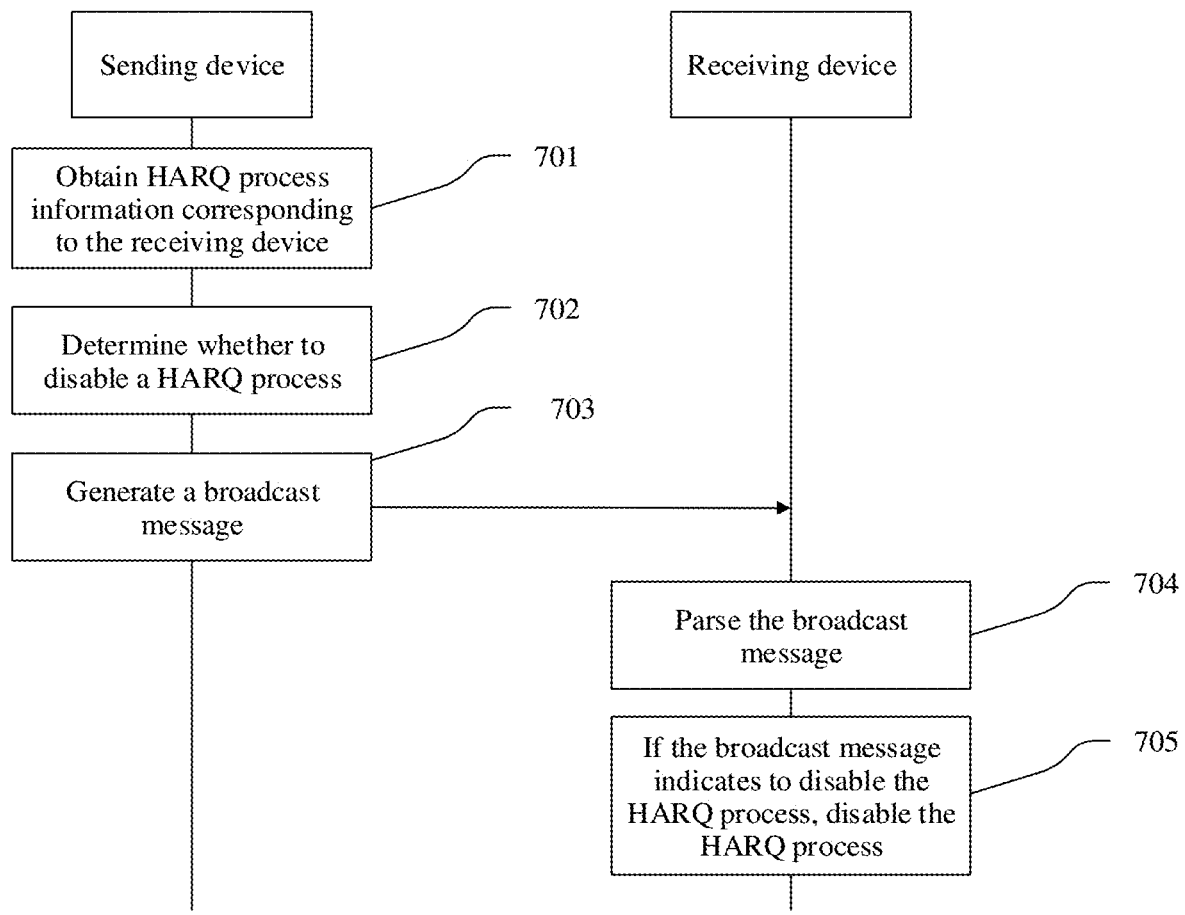
FIG. 7 is a schematic flowchart of another HARQ process disabling method according to this application.

Optionally, when the indication data is a network identifier number, a specific schematic flowchart may be shown in FIG. 7, and may include the following steps.

701: A sending device obtains HARQ process information corresponding to a receiving device.

After the receiving device accesses the sending device, the sending device may determine whether to disable a HARQ process. Usually, the sending device may obtain HARQ process information corresponding to the receiving device.

The sending device may obtain data related to the receiving device from the sending device or from a server, and then obtain the HARQ process information of the receiving device from the data related to the receiving device. The HARQ process information includes a quantity of HARQ processes, a time domain resource or a frequency domain resource corresponding to each HARQ process, and the like.

702: The sending device determines whether to disable the HARQ process.

After obtaining the HARQ process information corresponding to the receiving device, the sending device determines whether the HARQ process information meets a second preset condition. If the HARQ process information meets the second preset condition, the sending device may determine to disable the HARQ process.

The second preset condition may be that the quantity of HARQ processes is greater than a threshold, or that buffer space in the receiving device is less than a threshold. The threshold may be a preset value, maximum storage space occupied by the HARQ process, or indication data that is included in the HARQ process information and that directly indicates to disable the HARQ process. Adjustment may be performed based on an actual application scenario. This is not limited in this application.

For example, in an actual application scenario such as an NR system, when a HARQ mechanism is enabled for communication between sending devices, specific buffer space is needed in the receiving device to stored received data for subsequent soft combination and decoding. A size of the buffer space is related to the quantity of HARQ processes, and the quantity of HARQ processes is $$N_{HARQ} = \left\lceil \frac{T_{sf} + T_{ue} + T_{ack} + T_{nb} + RTT}{T_{sf}} \right\rceil.$$

RTT represents round trip time (RTT) between the sending device and the receiving device, $T_{sf}$ represents a length of a subframe for transmitting data, $T_{ue}$ represents processing time of UE, $T_{ack}$ represents transmission time of an acknowledgment (ACK) or a negative acknowledgment (NACK), $T_{nb}$ represents processing time of a gNB, and $M_{rx} = N_{HARQ} N_{tr} M_p$ represents storage space required by the receiving device, where $N_{tr}$ represents a maximum quantity of transmission times including retransmission, and $M_p$ is a size of one packet. Therefore, a size of storage space required by the receiving device may be determined based on the quantity of HARQ processes. Usually, in the NR system, a quantity of supported HARQ processes is 16. Because the RTT in the NR system is relatively small, the quantity of HARQ processes mainly depends on the processing time of the UE and the processing time of the gNB. In an NTN system, large RTT leads to a spiraling quantity of HARQ processes. For example, RTT of a bentpipe satellite of the GEO is equal to 544 ms, and therefore a quantity of required HARQ processes is about 56 (in a case in which an SCS is equal to 15 kHz). If a quantity of retransmission times in the NTN system is the same as that in the NR system, storage space required by a receive end in the NTN is 560/16=35 times that required in the existing NR system. Therefore, the HARQ process occupies very large storage space in the receiving device. Therefore, in this embodiment of this application, the sending device may determine to disable the HARQ process, or the receiving device determines, based on a network identifier number stored in the receiving device, to disable the HARQ process. This reduces storage space in the receiving device that is occupied by the HARQ process.

In addition, when an NDI indicates newly transmitted data, buffered data may be cleared, but a bit related to the HARQ process cannot be reused as other data. In comparison with using the NDI to indicate newly transmitted or retransmitted data, in this embodiment of this application, optionally, after it is determined that the HARQ process is disabled, a subsequent bit related to the HARQ process may be reused to transmit reused data. Therefore, in this embodiment of this application, the sending device may determine to disable the HARQ, or the receiving device determines, based on the network identifier number, to disable the HARQ process. This may reduce storage space occupied by the HARQ process, improve a data throughput, and improve network resource utilization.

703: The sending device generates a broadcast message, and sends the broadcast message to the receiving device.

After determining to disable the HARQ process corresponding to the receiving device, the sending device generates the broadcast message used to indicate to disable the HARQ process, where the broadcast message meets a preset condition. The preset condition may be that a value of a first preset bit of the broadcast message is a first preset value, a value lower than a first value or higher than a second value, or the like. Adjustment may be performed based on an actual application scenario.

For example, the preset condition may be that the value of the first preset bit in the broadcast message is the first preset value, where the first preset value may be 0, 1, or the like as shown in Table 2

TABLE 2

| 1 bit | HARQ status |
|---|---|
| '0' | Enabled |
| '1' | Disabled |

When the value of the first preset bit is 1, the broadcast message indicates to disable the HARQ process. When the value of the first preset bit is 0, the broadcast message indicates to enable the HARQ process. Alternatively, the first preset bit is shown in Table 3.

TABLE 3

| 1 bit | HARQ status |
|---|---|
| '1' | Enabled |
| '0' | Disabled |

When the value of the first preset bit is 0, the broadcast message indicates to disable the HARQ process. When the value of the first preset bit is 1, the broadcast message indicates to enable the HARQ process.

For example, if the receiving device is a terminal device, the sending device may be a base station. Usually, when the terminal device accesses the base station, the base station may send a broadcast message to the terminal device that accesses the base station. The broadcast message may be a system information block (SIB) message, and the SIB message may include a SIB 1, a SIB 2, a SIB 3, and the like. Different SIB messages can carry different data. The broadcast message in this embodiment of this application may be the SIB 1, the SIB 2, the SIB 3, or the like. For example, usually, a plurality of different SIBs are defined in the NR system, each SIB carries a different type of data, and specific content corresponding to each SIB is different from that in an LTE system. For example, in the NR, the SIB 1 provides initial access information of user equipment (UE), and in the LTE system, initial information is provided by the SIB 2. In addition, in the NR, the SIB 1 is periodically broadcast at an interval of 160 ms, and other SIBs may be transmitted in a plurality of manners: (1) transmission is still performed periodically at a fixed interval in a manner same as that in the LTE; (2) after the UE accesses a network, transmission is performed based on a request of the UE, to reduce signaling overheads. However, because an MSG 3 (message 3) in random access supports a HARQ function, when performing random access, the UE needs to determine to disable or enable the HARQ process. Therefore, the indication data may be a SIB message. For example, the indication data may be a SIB 1 message. Alternatively, it may be understood that the SIB 1 message carries data indicating to disable or enable the HARQ process. The indication data may be added to the SIB 1 message in a plurality of manners. For example, one-bit information may be added to a cellAccessRelatedInfo field of the SIB 1 message, and is used to indicate to enable or disable the HARQ process. Alternatively, a field is added to the SIB 1 message, for example, the SIB 1 message may be named HARQDisableIndicator, and a specific range of HARQDisableIndicator may be (0, 1).

704: The receiving device parses the broadcast message.

After receiving the broadcast message, the receiving device parses the broadcast message, to obtain data carried in the broadcast message.

Usually, the broadcast message received by the receiving device is data modulated by the sending device. After receiving the broadcast message, the receiving device may first perform demodulation, decoding, checking, or the like on the broadcast message, and then read data carried in the broadcast message.

705: If the broadcast message indicates to disable the HARQ process, the receiving device disables the HARQ process.

After obtaining the data carried in the broadcast message, the receiving device may read the first preset bit in the broadcast message, and determine, based on the first preset bit, whether to indicate to disable the HARQ process.

It may be determined that whether the value of the first preset bit in the broadcast message is the first preset value. If the value of the first preset bit is the first preset value, the receiving device determines that the value of the first preset bit indicates to disable the HARQ process, and the receiving device disables the HARQ process.

Therefore, in this embodiment of this application, after determining to disable the HARQ process, the sending device may notify, by using the broadcast message, the receiving device to disable the HARQ process, so that the receiving device disables the HARQ process. This prevents the HARQ process from occupying excessively large buffer space. In addition, after the HARQ process is disabled, subsequent data related to the HARQ process may be reused. This improves transmitted data utilization, saves network resources, and enhances system performance.

Figure 8:
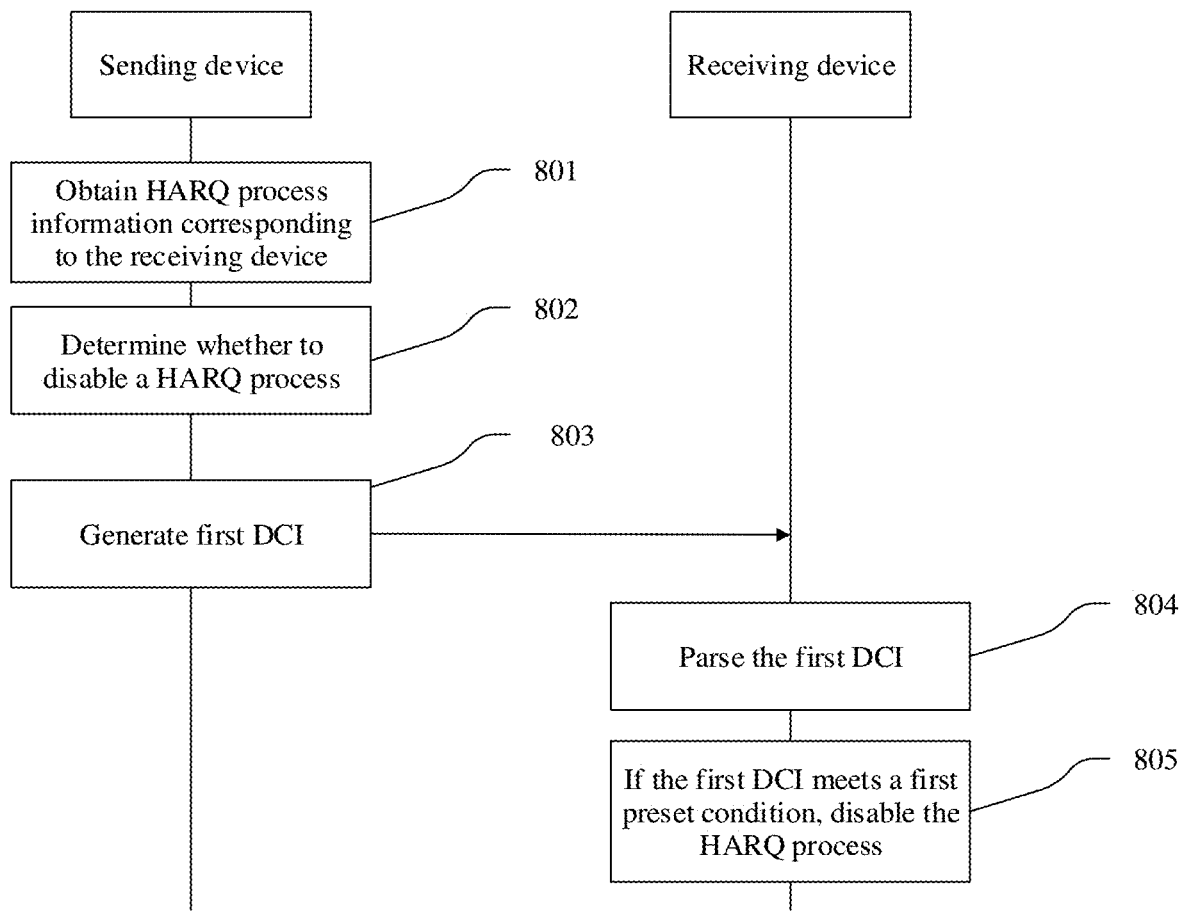
FIG. 8 is a schematic flowchart of another HARQ process disabling method according to this application.

The indication data may be a broadcast message, or DCI. When the indication data is downlink control information, a specific schematic flowchart may be shown in FIG. 8, and may include the following steps.

801: A sending device obtains HARQ process information corresponding to a receiving device.

802: The sending device determines whether to disable the HARQ process.

It should be noted that step 801 and step 802 in this embodiment of this application are similar to step 701 and step 702 in FIG. 7. Details are not described herein again.

803: The sending device generates first DCI.

After determining to disable the HARQ process of the receiving device, the sending device may notify the receiving device by using DCI, that is, the sending device may generate the first DCI.

The DCI may indicate to disable the HARQ process in a plurality of manners, including adding data of a preset length to the first DCI, adjusting a field length related to the HARQ in the DCI, and the like. For example, the following describes the two manners.

1. A second preset bit in the DCI is a second preset value.

A value of the second preset bit in the first DCI is set to the second preset value. The second preset bit is a bit corresponding to the HARQ process in the first DCI, or a newly added bit. When the second preset bit is a newly added bit in the first DCI, data of a preset length may be added to the first DCI, and the data of a preset length is used to indicate whether to disable the HARQ process. When the second preset bit is a bit corresponding to the HARQ process in the first DCI, the second preset bit may include a bit related to an NDI, a quantity of HARQ processes, or the like.

For example, one-bit information may be added to the first DCI to indicate to enable or disable the HARQ. DCI_0 is used as an example. A one-bit HARQ status indication may be added to DCI_0. Data included in DCI_0 after the one-bit information is added may be shown in Table 4.

The DCI usually carries data related to the HARQ, for example, the NDI, the RV, and the quantity of HARQ processes in Table 4. The field length of the data related to the HARQ may be adjusted to indicate to disable or enable the HARQ process.

For example, as shown in Table 4, the field length of the data related to the HARQ is 7 bits. When the sending device determines to disable the HARQ process, the 7-bit data may be reused as other data, and a field length of the reused data is k, where k may be greater than 7 or less than 7. When detecting that the field length of the data related to the HARQ is 7, the receiving device may determine to disable the HARQ process or not to enable the HARQ process.

804: The receiving device parses the first DCI.

After receiving the first DCI, the receiving device may parse the first DCI, to extract information carried in the first DCI.

Usually, the first DCI received by the receiving device is data modulated by the sending device. After receiving the first DCI, the receiving device may first perform demodulation, decoding, checking, or the like on the first DCI, and then extract data carried in the first DCI.

805: If the first DCI meets a first preset condition, the receiving device disables the HARQ process.

TABLE 4

| Area | A quantity of bits | Description |
| --- | --- | --- |
| Format indication of DCI | 1 | Distinguish whether the DCI is for uplink or downlink |
| Frequency domain resource allocation | N | Indicate an RB location, where a quantity of occupied bits is related to bandwidth |
| Time domain resource allocation | 4 | Indicate allocation of a time domain resource |
| Frequency hopping indication | 1 | Indicate whether to perform frequency hopping |
| MCS | 5 | Indicate a modulation mode, a bit rate, and a TB size |
| NDI | 1 | Indicate whether data is newly transmitted |
| RV | 2 | Indicates a redundancy version of transmission |
| A quantity of HARQ processes | 4 | Indicate the quantity of HARQ processes for transmission or retransmission |
| TPC command | 2 | Indicate an adjustment step of power control |
| UL/SUL indication | 0 or 1 | Indicate whether UL or SUL is used for transmission, where if the SUL does not exist, the quantity of bits is 0 |
| HARQ disabling indication | 1 | Indicate whether to disable a HARQ |

As shown in Table 4, one bit may be added to a last bit of DCI_0, to indicate whether to disable the HARQ. It is clear that in addition to adding one bit to a last bit of the DCI, bit data of a preset length may be added to another location of the DCI. Adjustment may be performed based on an actual application scenario. More specifically, "0" may indicate to disable the HARQ process, and '1' indicates to enable the HARQ process, or '1' indicates to disable the HARQ process, and "0" indicates to enable the HARQ process.

Alternatively, one bit may not be added to DCI_0, and at least one bit in data occupied by the NDI, the RV, or the quantity of HARQ processes may be directly set to the second preset value. For example, seven bits occupied by the NDI, the RV, and the quantity of HARQ processes may be all set to 0, that is, "0000000", or all set to 1, that is, "1111111", or set to preset values according to a rule agreed with the receiving device. Adjustment may be performed based on an actual application scenario.

2. A field length related to the HARQ in the DCI is adjusted.

After obtaining the information carried in the first DCI, the receiving device processes the carried information. The first DCI may include data related to the HARQ process.

The receiving device may determine whether the received first DCI meets the first preset condition. The first preset condition may be that the first DCI may include the second preset bit that directly indicates to disable the HARQ process, the field length that corresponds to the HARQ process and that is included in the first DCI is a preset length, or the like. After determining that the first DCI meets the first preset condition, the receiving device may determine to disable the HARQ process, directly not to enable the HARQ process, or the like.

After the receiving device disables the HARQ process, the data related to the HARQ in the DCI may be reused as other data. In addition, if the field length corresponding to the HARQ process in the DCI is used to indicate whether to disable the HARQ process, the field length corresponding to the HARQ process in the first DCI may be reused as other data if it is determined to disable the HARQ process. This improves network resource utilization. Alternatively, the field length may not be reused as other data to reduce signaling overheads.

Therefore, in this embodiment of this application, the DCI may indicate whether to disable the HARQ process. After determining that the first DCI meets the first preset condition, the receiving device may determine to disable the HARQ process. Therefore, the receiving device may accurately determine, based on the received DCI, whether to disable the HARQ process. This prevents the HARQ process from occupying excessively large buffer space. In addition, after the HARQ process is disabled, subsequent data related to the HARQ process may be reused. This improves transmitted data utilization, saves network resources, and enhances system performance.

Figure 9:
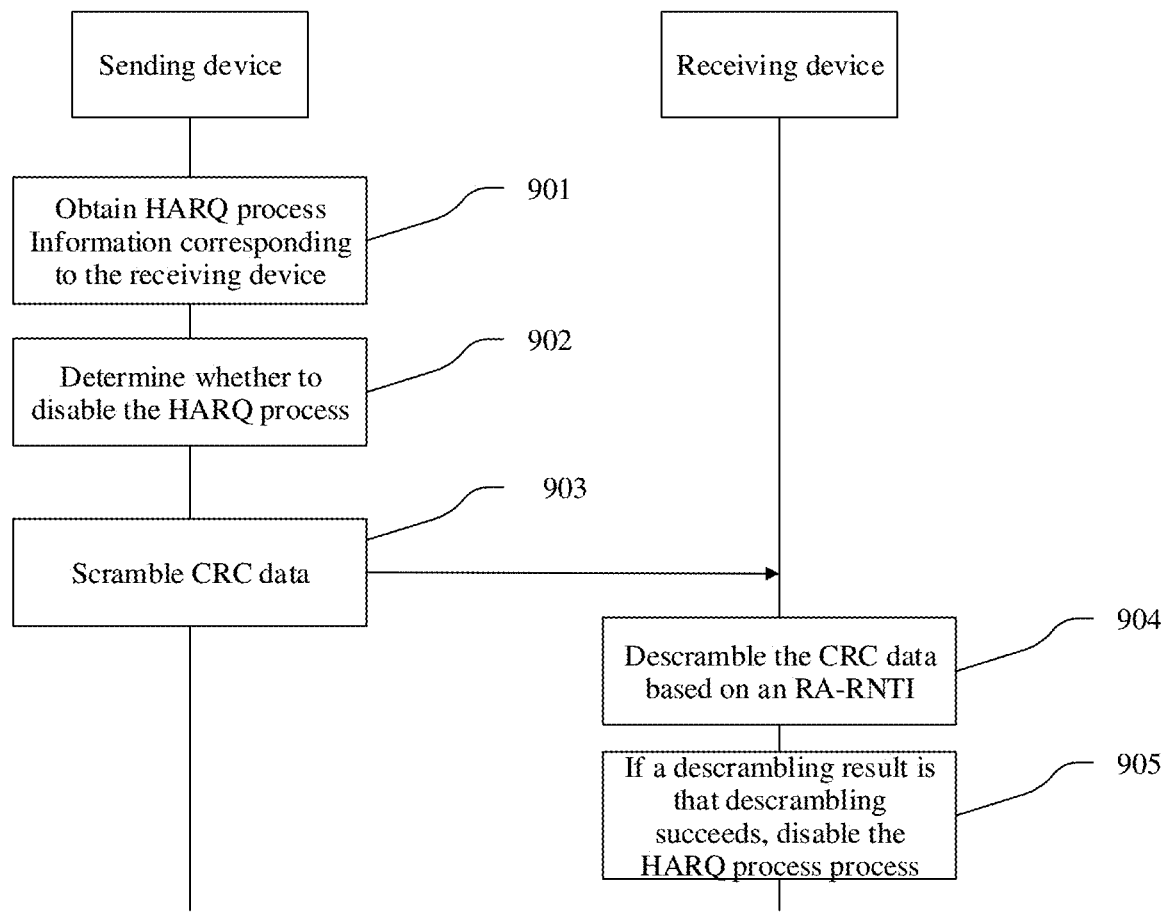
FIG. 9 is a schematic flowchart of another HARQ process disabling method according to this application.

When the indication data is CRC data, a specific schematic flowchart may be shown in FIG. 9, and may include the following steps.

901: A sending device obtains a HARQ process corresponding to a receiving device.

902: The sending device determines whether to disable the HARQ process.

It should be noted that step 901 and step 902 in this embodiment of this application are similar to step 701 and step 702 in FIG. 7. Details are not described herein again.

903: The sending device scrambles CRC data.

After determining to disable the HARQ process, the sending device scrambles the CRC data by using a random access radio network temporary identifier (RA-RNTI).

The CRC data may be CRC of any data sent by the sending device to the receiving device, or may be CRC of preset data, or the like. Adjustment may be performed based on an actual application scenario. For example, in an NR system, because an MSG 3 in random access supports a HARQ function, when a terminal device randomly accesses a base station, and before the MSG 3 is sent, the terminal device needs to determine whether to disable or enable the HARQ process. Therefore, the CRC data may be CRC of any message before the MSG 3 is sent. For example, the CRC data may be a DCI message, or may be a SIB message.

In addition, the CRC data may be scrambled by using the RA-RNTI in a plurality of manners. For example, when determining to disable the HARQ process, the sending device may scramble data of a third preset bit in the CRC data by using the RA-RNTI. Alternatively, after processing the RA-RNTI to obtain offset data, the sending device scrambles the CRC data by using the offset data. More specifically, that the sending device processes the RA-RNTI may be as follows the sending device may adjust a sequence of the RA-RNTI according to a preset rule, to obtain the offset data, and scrambles the CRC data based on the offset data. Alternatively, the sending device may add a preset offset value to the RA-RNTI, to obtain the offset data, and scrambles the CRC data based on the offset data. Alternatively, the sending device may directly perform shifting on the RNTI, or add data of a preset length to the RA-RNTI. Alternatively, the sending device may map the RA-RNTI according to a preset mapping rule, to obtain the offset data. Adjustment may be performed based on an actual application scenario.

Figure 10A:
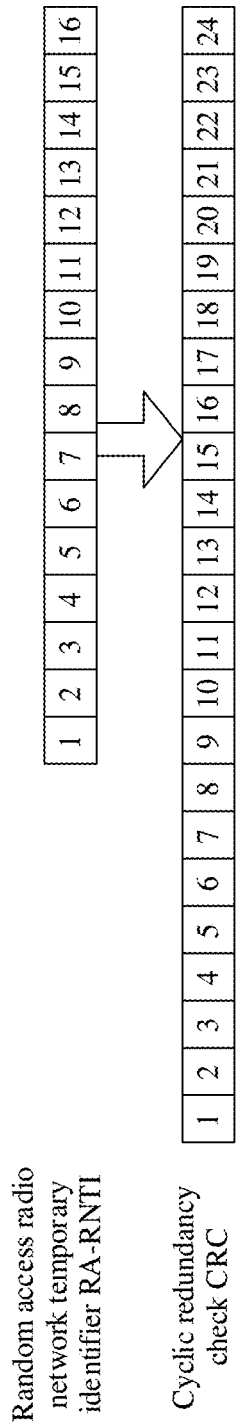
FIG. 10a is a schematic diagram of a scrambling manner in a HARQ process disabling method according to this application.
Figure 10B:
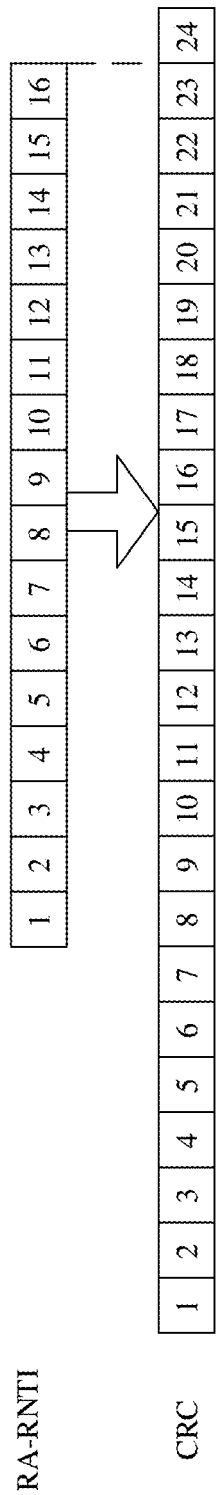
FIG. 10b is a schematic diagram of another scrambling manner in a HARQ process disabling method according to this application.

When determining to disable the HARQ process, the sending device may scramble the data of the third preset bit in the CRC data by using the RA-RNTI. For example, usually, in the NR system, if a length of the CRC is 24 bits, and a length of the RA-RNTI is 16 bits, the RA-RNTI may be scrambled to last 16 bits of the CRC, that is, a $9^{th}$ bit to a $24^{th}$ bit. In this embodiment of this application, the RA-RNTI may be scrambled to different locations, to indicate different information. In this embodiment of this application, when determining not to disable the HARQ process, the sending device may scramble the RA-RNTI to last 16 bits of the CRC, as shown in FIG. 10a. When determining to disable the HARQ process, the sending device may scramble the RA-RNTI to locations different from the last 16 bits in the CRC. For example, as shown in FIG. 10b, the sending device may scramble the RA-RNTI to $7^{th}$ to $23^{rd}$ bits of the CRC or other locations, to indicate the receiving device to disable the HARQ process. Usually, to reduce decoding complexity of the receiving device, when determining to disable the HARQ process, the sending device may scramble the RA-RNTI to the $8^{th}$ to $23^{rd}$ bits of the CRC, that is, one bit forward compared to $9^{th}$ to $24^{th}$ bits in a case in which the sending device determines not to disable the HARQ process.

Figure 11A:
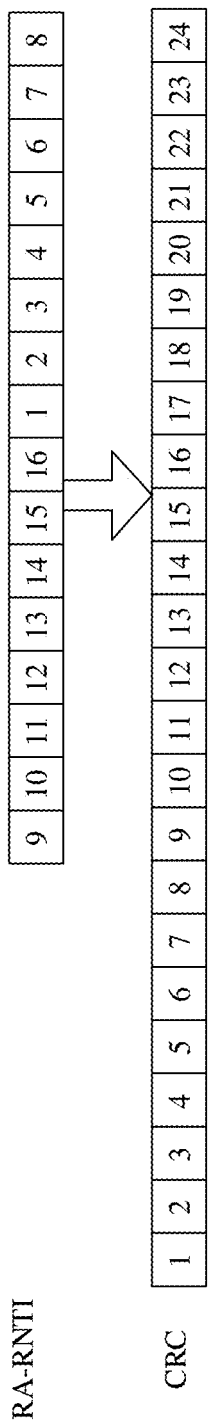
FIG. 11a is a schematic diagram of another scrambling manner in a HARQ process disabling method according to this application.
Figure 11B:
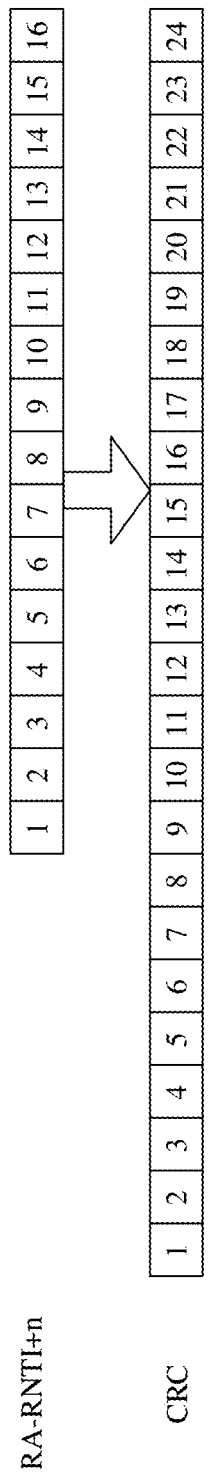
FIG. 11b is a schematic diagram of another scrambling manner in a HARQ process disabling method according to this application.

It is assumed that the sending device adjusts the sequence of the RA-RNTI according to the preset rule, to obtain an RA-RNTI whose sequence is adjusted, and scrambles the CRC data based on the RA-RNTI whose sequence is adjusted. For example, if the RA-RNTI has 16 bits in total, the 16 bits may be divided into first m bits and last n bits, where m+n=16, and both m and n are positive integers. For example, when m and n are both equal to 8, if the sending device determines to disable the HARQ process, the sending device may exchange a sequence of the m bits with the n bits, that is, exchange m+n bits into n+m bits, as shown in FIG. 11a, and scramble the CRC data by using an RA-RNTI whose sequence is adjusted, to indicate the receiving device to disable the HARQ process. If the sending device determines not to disable the HARQ process, the sending device may continue to scramble the CRC data by using the RA-RNTI whose sequence is m+n, as shown in FIG. nb, to indicate the receiving device not to disable the HARQ process. Alternatively, it is clear that the CRC may be scrambled by using the RA-RNTI whose sequence is m+n, to indicate to disable the HARQ process, and be scrambled by using the RA-RNTI whose sequence is n+m, to indicate not to disable the HARQ process.

Figure 12:
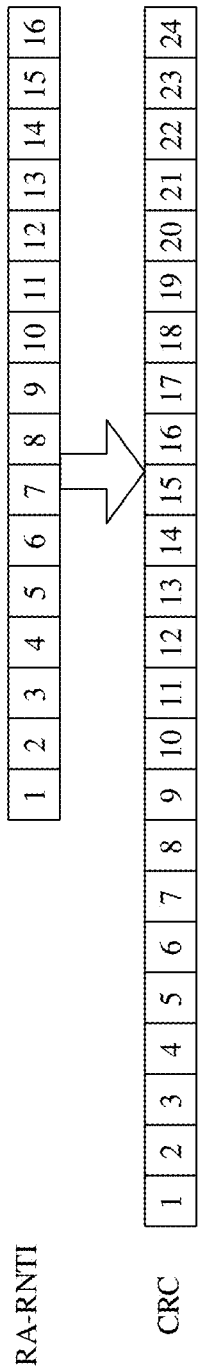
FIG. 12 is a schematic diagram of another scrambling manner in a HARQ process disabling method according to this application.

When the sending device adds the preset offset value to the RA-RNTI, to obtain the offset data, and scrambles the CRC data based on the offset data, for example, in the NR system, a gNB calculates the RA-RNTI based on a time-frequency location of a received MSG 1 (message 1) and scrambles the CRC data. An offset operation may be performed on the RA-RNTI to some extent, that is, the CRC data is scrambled by using an RA-RNTI to which k is added, where k is a positive integer greater than 0. To be specific, k is the preset offset value, as shown in FIG. 12. Then, when the sending device generates an MSG 2 (message 2), if the sending device determines to disable the HARQ process, the sending device may scramble the CRC data by using the RA-RNTI to which k is added, to indicate the receiving device to disable the HARQ process. If the sending device determines not to disable the HARQ process, the sending device may scramble the CRC by using the RA-RNTI, to indicate the receiving device not to disable the HARQ process. Alternatively, it is clear that the CRC may be scrambled by using the RA-RNTI to which k is added, to indicate the receiving device not to disable the HARQ process. Alternatively, the CRC may be scrambled by using the RA-RNTI, to indicate the receiving device to disable the HARQ process.

In addition, the sending device may map the RA-RNTI according to the preset mapping rule, to obtain the offset data, where the offset data includes or implicitly includes the RA-RNTI. The preset mapping rule may be that the RA-RNTI is mapped to a value different from the RA-RNTI. For example, the preset mapping rule may be that two RA-RNTIs with similar values are mapped to two values that differ greatly, to reduce a false detection probability of received data.

A process of scrambling the CRC data may be as follows. After determining data that is used for scrambling the CRC, for example, the data may be an RA-RNTI, an RA-RNTI whose sequence is n+m, an RA-RNTI to which k is added, or the like, a scrambling polynomial is determined. Then, an exclusive OR operation is performed on the scrambling polynomial and data that needs to be scrambled in the CRC data, to obtain scrambled CRC data. Correspondingly, when receiving the CRC data, the receiving device needs to descramble the CRC data, that is, perform data recovery on the CRC by using the scrambling polynomial.

Therefore, in this embodiment of this application, the CRC may be scrambled in the plurality of manners. The CRC indicates the receiving device to disable or not to disable the HARQ process, so that the receiving device may accurately determine, based on the scrambled CRC, whether to disable the HARQ process.

904: The receiving device descrambles the CRC data based on the RA-RNTI.

After receiving the CRC data in data sent by the sending device, the receiving device descrambles the CRC data by using the RA-RNTI. The receiving device may descramble the received CRC data in a manner corresponding to a scrambling manner used by the sending device.

The data of the third preset bit of the CRC may be descrambled by using the RA-RNTI, or the CRC data may be descrambled by using the RA-RNTI whose sequence is adjusted, or the CRC data may be descrambled by using the RA-RNTI whose preset offset value is shifted, or the RA-RNTI may be mapped according to the preset mapping rule to obtain the offset data. Adjustment may be performed based on an actual application scenario.

905: If a descrambling result is that descrambling succeeds, the receiving device disables the HARQ process.

After obtaining the CRC data sent by the HARQ process, the receiving device descrambles the CRC data based on the RA-RNTI. If descrambling succeeds, it may be determined that the CRC data indicates to disable the HARQ process, and the receiving device may disable the HARQ process based on the indication of the CRC.

If the sending device scrambles the data of the third preset bit or data of another bit in the CRC data by using the RA-RNTI, after obtaining the CRC data, the receiving device descrambles the data of the third preset bit in the CRC data by using the RA-RNTI. If descrambling succeeds, it may be determined that the CRC data indicates to disable the HARQ process. For example, in the NR system, if a length of the CRC is 24 bits, a length of the RA-RNTI is 16 bits. Last 16 bits of the CRC, that is, an $8^{th}$ bit to a $24^{th}$ bit, may be descrambled by using the RA-RNTI. If descrambling succeeds, it is determined that the CRC indicates not to disable the HARQ process. Alternatively, if descrambling fails, $8^{th}$ to $23^{rd}$ bits may be descrambled, and if descrambling succeeds, it may be determined that the CRC indicates to disable the HARQ process. Alternatively, it is clear that last 16 bits of the CRC, that is, an $8^{th}$ bit to a $24^{th}$ bit, may be descrambled by using the RA-RNTI. If descrambling succeeds, it is determined that the CRC indicates to disable the HARQ process. Alternatively, if descrambling fails, $8^{th}$ to $23^{rd}$ bits may be descrambled, and if descrambling succeeds, it may be determined that the CRC indicates not to disable the HARQ process. How to indicate to disable the HARQ process or a sequence of using different data to descramble may be adjusted based on an actual application scenario.

If the sending device adjusts the sequence of the RA-RNTI according to the preset rule, to obtain the RA-RNTI whose sequence is adjusted, namely, the offset data, and scrambles the CRC data based on the RA-RNTI whose sequence is adjusted, the receiving device may descramble the CRC data by using the RA-RNTI and the RA-RNTI whose sequence is adjusted. If descrambling the CRC data by using the RA-RNTI succeeds, it may be determined that the CRC data indicates not to disable the HARQ process. If descrambling the CRC data by using the RA-RNTI whose sequence is adjusted succeeds, it may be determined that the CRC data indicates to disable the HARQ process. Alternatively, it is clear that if descrambling the CRC data by using the RA-RNTI succeeds, it may be determined that the CRC data indicates to disable the HARQ process. If descrambling the CRC data by using the RA-RNTI whose sequence is adjusted succeeds, it may be determined that the CRC data indicates not to disable the HARQ process. For example, if the RA-RNTI has 16 bits, and the 16 bits may be divided into first m bits and last n bits, where m+n=16, and both m and n are positive integers, the CRC may be descrambled by using the RA-RNTI whose sequence is m+n. If descrambling succeeds, it may be determined that the CRC indicates not to disable the HARQ process. If descrambling fails, the CRC may be descrambled by using the RA-RNTI whose sequence is n+m; and if descrambling succeeds, it may be determined that the CRC indicates to disable the HARQ process. Alternatively, the CRC may be descrambled by using the RA-RNTI whose sequence is m+n. If descrambling succeeds, it may be determined that the CRC indicates to disable the HARQ process. If descrambling fails, the CRC may be descrambled by using the RA-RNTI whose sequence is n+m; and if descrambling succeeds, it may be determined that the CRC indicates not to disable the HARQ process. How to indicate to disable the HARQ process or a sequence of using different data to descramble may be adjusted based on an actual application scenario.

If the sending device shifts the RA-RNTI by the preset offset value, to obtain the offset data, and scrambles the CRC data based on the offset data, after obtaining the CRC data, the receiving device may descramble the CRC data by using the RA-RNTI or the offset data. The CRC data may be descrambled by using the RA-RNTI. If descrambling succeeds, it is determined that the CRC data indicates to disable the HARQ process. If descrambling fails, the CRC data is continued to be descrambled by using the offset data; and if descrambling succeeds, it may be determined that the CRC indicates not to disable the HARQ process. Alternatively, it is clear that the CRC data may be descrambled by using the RA-RNTI. If descrambling succeeds, it is determined that the CRC data indicates not to disable the HARQ process. If descrambling fails, the CRC data is continued to be descrambled by using the offset data; and if descrambling succeeds, it may be determined that the CRC indicates to disable the HARQ process. How to indicate to disable the HARQ process or a sequence of using different data to descramble may be adjusted based on an actual application scenario.

Therefore, in this embodiment of this application, the CRC data may be scrambled by using RA-RNTIs in different forms, and whether the CRC data indicates to disable the HARQ process can be accurately determined. This may prevent the HARQ process from occupying excessively large buffer space. In addition, after the HARQ process is disabled, subsequent data related to the HARQ process may be reused. This improves transmitted data utilization, saves network resources, and enhances system performance.

Figure 13:
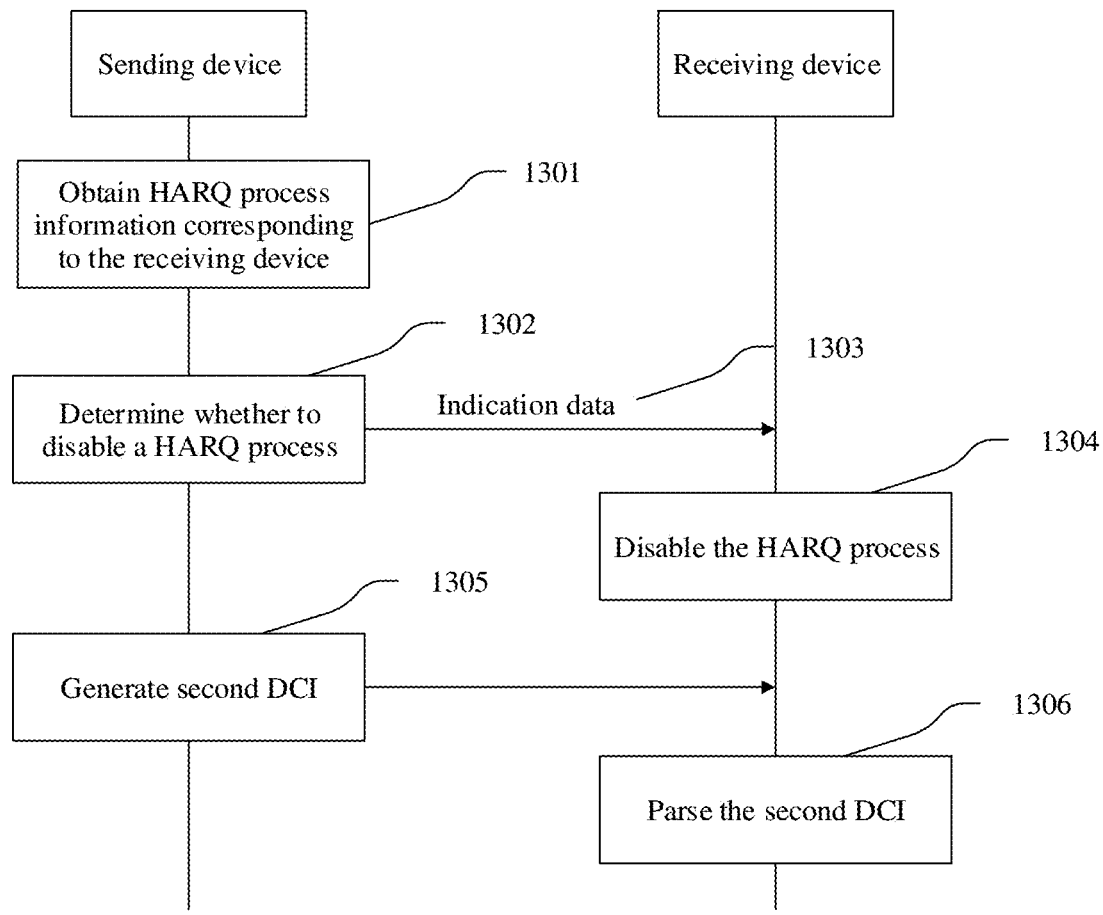
FIG. 13 is a schematic flowchart of another HARQ process disabling method according to this application.

The foregoing describes a specific procedure in which the receiving device determines to disable the HARQ process in this embodiment of this application. After the receiving device disables the HARQ process, based on any implementation in FIG. 5 to FIG. 12, data corresponding to the HARQ process in subsequent DCI may continue to be reused. As shown in FIG. 13, the method may include the following steps.

1301: A sending device obtains a HARQ process corresponding to a receiving device.

1302: The sending device determines whether to disable the HARQ process.

It should be noted that step 1301 and step 1302 in this embodiment of this application are similar to step 701 and step 702 in FIG. 7. Details are not described herein again.

1303: The sending device sends indication data.

After determining whether to disable the HARQ process, the sending device generates indication data used to indicate whether to disable the HARQ process. The indication data may be a network identifier number, first DCI, a broadcast message, CRC data, or the like. For details, refer to steps in any one of the foregoing embodiments in FIG. 5 to FIG. 12. Details are not described herein again.

1304: The receiving device disables the HARQ process.

After receiving the indication data used to indicate to disable the HARQ process, the receiving device may determine, based on the indication data, to disable the HARQ process. Disabling the HARQ process includes not enabling the HARQ process, disabling the entire running HARQ process or a part of the running HARQ process, or the like.

In addition, after determining to disable the HARQ, the receiving device may enable an ARQ mechanism to perform data transmission. In the ARQ mechanism, when data received by the receiving device fails to be decoded or a relatively large amount of data is lost, the receiving device may directly discard the data, and notify the sending device of retransmitting data, without occupying excessively large buffer space. This may improve a throughput between the receiving device and the sending device.

1305: The sending device generates second DCI.

After determining to disable the HARQ process, and notifying the receiving device of disabling the HARQ process, the sending device may generate the second DCI, where a fourth preset bit corresponding to the HARQ process in the second DCI may be used to transmit reused data after the HARQ process is disabled. The fourth preset bit is a vacated bit after the HARQ process is disabled, that is, a bit related to the HARQ process when the HARQ process is not disabled. To be specific, data related to the HARQ process in the second DCI may be reused as other data. The second DCI is DCI data obtained after the sending device determines to disable the HARQ process and notifies the receiving device to disable the HARQ process.

For example, if the HARQ process is not disabled, DCI_0 may include an NDI, an RV, a quantity of HARQ processes, and the like that are related to the HARQ process. However, in this embodiment of this application, after the HARQ process is disabled, that is, after the sending device notifies the receiving device to disable the HARQ process, a HARQ mechanism is not enabled between the sending device and the receiving device. Therefore, when reading data related to the HARQ process in DCI_0, the receiving device does not use the data. However, in this embodiment of this application, data related to the HARQ in the DCI may be other reused data. The reused data may include one or more of over-the-top time of a satellite corresponding to the receiving device, a power adjustment step, an interleaving depth, and interruption duration of the satellite corresponding to the receiving device.

Figure 14:
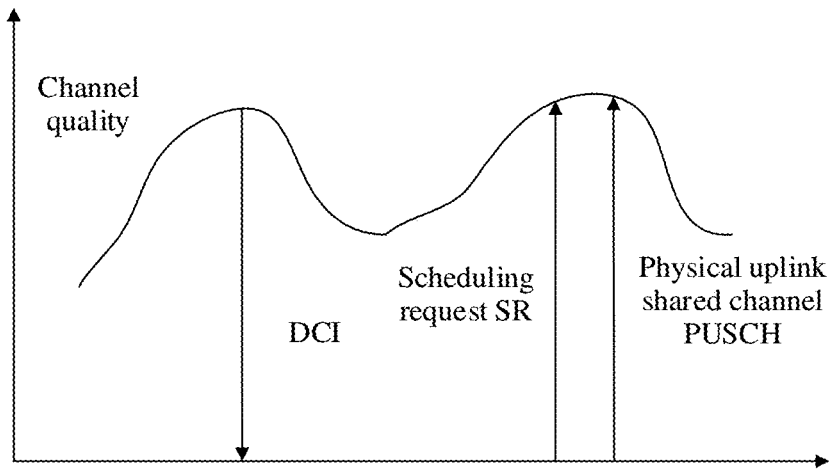
FIG. 14 is a schematic diagram in which a satellite reaches the top in a HARQ process disabling method according to this application.

For example, the reused data may include the over-the-top time of the satellite corresponding to the receiving device. Usually, for a non-GEO satellite, different beams alternately reach the top to serve one UE. Therefore, a regular change occurs between the non-GEO satellite and the UE as the satellite moves. For example, FIG. 14 shows an over-the-top rule of one satellite. If the UE learns over-the-top information of the satellite, the UE may determine uplink transmission time, to improve transmission reliability and a throughput. For example, usually, to ensure that a series of uplink scheduling procedures, for example, the UE sends DCI, a scheduling request (SR), and a buffer status report (BSR), or data is transmitted through a physical uplink shared channel (PUSCH), occur at a moment when quality of the channel is relatively good, a gNB may notify the UE of next over-the-top time of the beam by using the second DCI after the HARQ process is disabled, so that the UE determines a moment of sending uplink data at next time. Therefore, in this embodiment of this application, in the second DCI, the data related to the HARQ process is replaced with the over-the-top information of the satellite corresponding to the UE, so that the UE can send the uplink data at a moment when quality of the channel is relatively good. This improves reliability of uplink data transmission and improves a network throughput.

Figures 15, 16A:
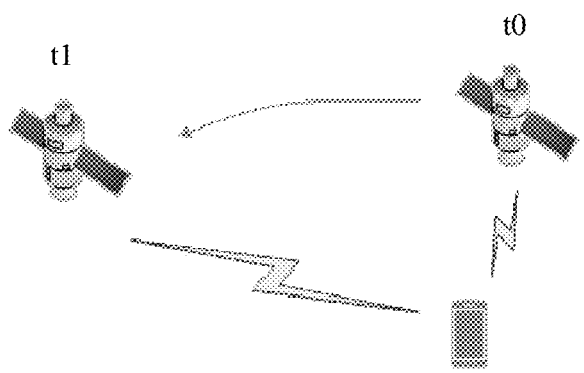
FIG. 15 is a schematic diagram of a distance between a satellite and a receiving device in a HARQ process disabling method according to this application.
FIG. 16a is a schematic diagram of an interleaving manner in a HARQ process disabling method according to this application.

For example, the reused data may further include the power adjustment step. Usually, a non-GEO satellite system differs significantly from a terrestrial system in NR. Only UE moves in the terrestrial system, but a satellite and UE move simultaneously in the non-GEO satellite system. For example, as shown in FIG. 15, at a moment to, the satellite is relatively close to the UE. At a moment ti, because the satellite moves quickly, a distance between the satellite and the UE changes greatly. However, when the distance between the satellite and the UE changes greatly, power for performing data transmission between the UE and the satellite also changes, and a change range is relatively large. In a scenario in which the change range of the power is relatively large, a larger power adjustment step is required to more rapidly adjust the transmission power between the UE and the satellite. Usually, in the existing NR system, the power control data occupies two-bit information, and only indicates four steps (−1 dB, 0 dB, +1 dB, and +3 dB). However, in this embodiment of this application, because the data related to the HARQ process in the DCI may be reused, a length of the power control data may be increased, and more steps may be transmitted. For example, if two bits are added to the DCI, that is, four bits are used to transmit power control data, eight steps (−7 dB, −5 dB, −3 dB, −1 dB, 0 dB, +1 dB, +3 dB, and +5 dB) may be indicated, so that a range of the power adjustment step is larger, and a power adjustment speed is faster. This improves data transmission efficiency between the UE and the satellite.

For example, the reused data may further include the interleaving depth. Usually, a delay of a GEO satellite is relatively large. When scheduling is performed, for an uplink direction, a channel quality indicator (CQI) fed back by UE expires, or a determined modulation and coding scheme (MCS) expires. For a downlink direction, an MCS expires. The foregoing expiration phenomena cause a mismatch between adaptive modulation and coding (AMC) and a channel, and an increase of a block error rate (BLER) of a communications system. However, in a power control method, only a change of a large granularity is tracked, and a change of a small granularity in the channel cannot be tracked effectively. Therefore, to overcome impact caused by the small granularity, symbol interleaving or subframe interleaving may be introduced, to average impact on the channel. For example, the symbol interleaving may be shown in FIG. 16a, and an arrangement sequence of symbols may be adjusted according to a preset rule. Alternatively, the subframe interleaving is shown in FIG. 16b, and a structure of subframes may be changed. The interleaving depth, as an adjustable parameter, may be adaptively changed based on a delay requirement or a channel condition. Interleaving is used to process data before transmission. This may overcome fading, reduce a data loss rate, and make it easier for the receiving device to recover data. Some or all of the data related to the HARQ process in the second DCI may be reused, to notify the UE of the interleaving depth. For example, two-bit data is reused as an interleaving depth, and a mapping relationship between bits and an interleaving depth may be shown in Table 5.

TABLE 5

| 00 | 01 | 10 | 11 |
|---|---|---|---|
| 40 ms | 80 ms | 160 ms | 240 ms |

00 may indicate an interleaving depth of 40 ms, 01 indicates an interleaving depth of 80 ms, 10 indicates an interleaving depth of 160 ms, and 11 indicates an interleaving depth of 240 ms. Therefore, in this embodiment of this application, the data related to the HARQ process in the second DCI may be reused as the interleaving depth, so that the receiving device may determine an interleaving depth based on reused data included in the second DCI, and further perform de-interleaving on received interleaved data. This reduces impact of fading, reduces a probability of data loss, and improves data transmission reliability.

For example, the reused data may further include the interruption duration of the satellite corresponding to the receiving device. Usually, in an actual application, when UE searches for a satellite at an instant moment t, a link may be interrupted when the UE is not at a location of an elevation angle greater than a required one. For example, link interruption duration of different satellite systems is shown in Table 6.

TABLE 6

| Satellite system name | Mean interruption time | Minimum interruption time | Maximum interruption time | Standard interruption time |
|---|---|---|---|---|
| Iridium system | 97.7 | 3.4 | 1198.0 | 101.7 |
| Globalstar system | 76.3 | 7.1 | 220.0 | 60.4 |
| Odyssey system | 210.9 | 34.4 | 550.1 | 141.9 |

For the Iridium system, the mean interruption time is 97.7 ms, the minimum interruption time is 3.4 ms, the maximum interruption time is 1198.0 ms, and the standard interruption time is 101.7 ms. For the Globalstar system and the Odyssey system, as shown in Table 6, the rest may be deduced by analogy. When the link is interrupted, the satellite cannot receive uplink data sent by the UE. Alternatively, even if the satellite receives data, the satellite cannot decode the data correctly. Therefore, in the second DCI, the UE may be notified, by using some or all of the data related to the HARQ process, of duration T of next interruption time with the satellite. Therefore, the UE may sleep within the duration T. This may reduce power consumption and reduce interference in a network. Therefore, in this embodiment of this application, after the HARQ process is disabled, the data related to the HARQ process in the second DCI may be reused as the interruption duration of the satellite corresponding to the receiving device, so that the receiving device may learn of the link interruption duration with the satellite in advance, and make adequate preparation, for example, sleeping, or communicating in another manner. This may reduce power consumption of the receiving device, and reduce network interference to the receiving device.

It should be understood that the data related to the HARQ process in the second DCI may be simultaneously reused as one or more of the over-the-top time of the satellite corresponding to the receiving device, the power adjustment step, the interleaving depth, and the interruption duration of the satellite corresponding to the receiving device. In addition, the data related to the HARQ process in the second DCI may be reused as other data other than the over-the-top time of the satellite corresponding to the receiving device, the power adjustment step, the interleaving depth, and the interruption duration of the satellite corresponding to the receiving device. It is clear that the data related to the HARQ process in the second DCI may alternatively not be reused, to reduce signaling overheads and improve system performance. Adjustment may be performed based on an actual application scenario. This is not limited in this application.

1306: The receiving device parses the second DCI.

Correspondingly, after receiving the second DCI, the receiving device may parse the second DCI, to determine the data included in the second DCI. If the sending device replaces the data related to the HARQ process in the second DCI with the reused data, after receiving the second DCI, the receiving device may obtain the reused data in the second DCI, for example, one or more of the over-the-top time of the satellite corresponding to the receiving device, the power adjustment step, the interleaving depth, and the interruption duration of the satellite corresponding to the receiving device.

It should be understood that step 1305 and step 1306 in this embodiment of this application are optional steps.

Therefore, in this embodiment of this application, after determining to disable the HARQ process, the sending device may reuse the data related to the HARQ process as other data, to implement data reusing. This improves network resource utilization between the sending device and the receiving device. In addition, the sending device may notify the receiving device of other data, for example, the power adjustment step or the interleaving depth, so that communication of the receiving device is more stable. This improves transmission reliability of the receiving device, and improves network resource utilization. In addition, this may prevent the HARQ process from occupying excessively large buffer space. In addition, after the HARQ process is disabled, subsequent data related to the HARQ process may be reused. This improves transmitted data utilization, saves network resources, and enhances system performance.

In addition, in a possible implementation, if the receiving device does not support a HARQ function, after the sending device determines, in a pre-agreed manner or by using capability negotiation data sent by the receiving device, that the receiving device does not support the HARQ function, when communicating with the receiving device, the sending device disable the HARQ process, that is, does not enable the HARQ mechanism. For example, if a terminal device does not support the HARQ function, when the terminal device accesses a base station, the base station may obtain a feature of the terminal device, including that the terminal device does not support the HARQ function. The base station may determine that the HARQ mechanism is not used for communication with the terminal device. When performing data transmission, data may be transmitted only once, or data may be transmitted through an ARQ. Therefore, in this embodiment of this application, if the receiving device does not support the HARQ function, the sending device may directly determine to disable the HARQ process, and not enable the HARQ mechanism. This can reduce storage space in the receiving device occupied by the HARQ process, and reduce energy consumption of the receiving device.

Figure 17:
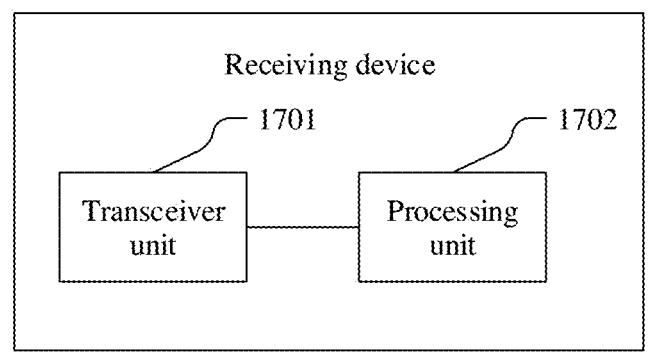
FIG. 17 is a schematic structural diagram of another receiving device according to this application.

The foregoing describes in detail the method provided in this application. In addition to the receiving device and the sending device provided in FIG. 2 to FIG. 4, this application further provides another sending device or receiving device. FIG. 17 is a schematic structural diagram of another receiving device according to this application. The receiving device may include a transceiver unit 1701, used by the receiving device to obtain indication data, where the indication data is used to indicate to disable a HARQ process; and a processing unit 1702, configured to disable the HARQ process.

The receiving device may perform the steps performed by the receiving device in the embodiments corresponding to FIG. 5 to FIG. 16b.

Optionally, in some possible implementations, the indication data includes a network identifier number.

The processing unit 1702 is configured to determine, based on a preset mapping relationship, that the network identifier number indicates to disable the HARQ process, and the receiving device disables the HARQ process.

Optionally, in some possible implementations, the indication data includes a broadcast message.

The processing unit 1702 is configured to if a value of a first preset bit in the broadcast message is a first preset value, disable the HARQ process.

Optionally, in some possible implementations, the indication data includes first downlink control information DCI.

The processing unit 1702 is configured to determine whether the first DCI meets a first preset condition; and if the first DCI meets the first preset condition, disable the HARQ process.

Optionally, in some possible implementations, the processing unit 1702 is configured to read a second preset bit in the first DCI; and if the second preset bit is determined to be a second preset value, determine that the first DCI meets the first preset condition.

Optionally, in some possible implementations, the processing unit 1702 is configured to obtain a field length corresponding to the HARQ process in the first DCI; and if the field length is a preset length, determine that the first DCI meets the first preset condition.

Optionally, in some possible implementations, the indication data includes cyclic redundancy check CRC data.

The processing unit 1702 is configured to descramble the CRC data based on a random access radio network temporary identifier RA-RNTI, to obtain a descrambling result; and if the descrambling result is that descrambling succeeds, disable the HARQ process.

Optionally, in some possible implementations, the processing unit 1702 is configured to descramble data of a third preset bit in the CRC data by using the RA-RNTI, to obtain the descrambling result.

Optionally, in some possible implementations, the processing unit 1702 is configured to process the RA-RNTI, to obtain offset data; and descramble the CRC data based on the offset data, to obtain the descrambling result.

Optionally, in some possible implementations, the processing unit 1702 is configured to adjust a sequence of the RA-RNTI according to a preset rule, to obtain the offset data; add a preset offset value to the RA-RNTI, to obtain the offset data; or map the RA-RNTI according to a preset mapping rule, to obtain the offset data.

Optionally, in some possible implementations, after the processing unit 1702 disables the HARQ process, the transceiver unit 1701 is further configured to receive second DCI, where a fourth preset bit related to the HARQ process in the second DCI is used to transmit reused data after the HARQ process is disabled, and the fourth preset bit is a vacated bit after the HARQ process is disabled.

Optionally, in some possible implementations, the reused data includes at least one of over-the-top time of a satellite corresponding to the receiving device, a power adjustment step, an interleaving depth, and interruption duration of the satellite corresponding to the receiving device.

Optionally, in some possible implementations, after the processing unit 1702 disables the HARQ process, the transceiver unit 1701 is further configured to perform data transmission by using an automatic repeat request ARQ.

Figure 18:
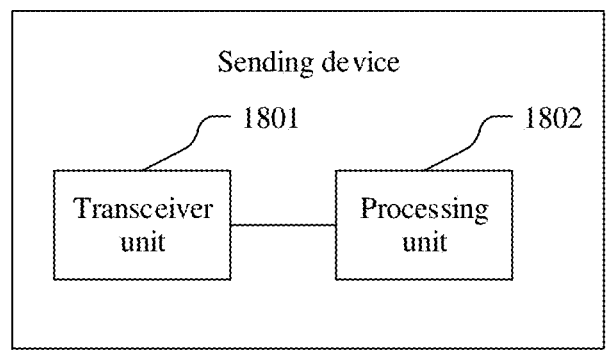
FIG. 18 is a schematic structural diagram of another sending device according to this application.

FIG. 18 is a schematic structural diagram of another sending device according to this application. The sending device may include a processing unit 1802, configured to obtain HARQ process information corresponding to a receiving device; and a transceiver unit 1801, configured to send indication data to the receiving device, if the sending device determines that the HARQ process information meets a second preset condition, where the indication data is used to indicate the receiving device to disable a HARQ process.

The sending device may be configured to perform the steps performed by the sending device in any one of the embodiments corresponding to FIG. 5 to FIG. 16b.

Optionally, in some possible implementations, the processing unit 1802 is further configured to determine that the HARQ process information meets the second preset condition, if the sending device determines that a quantity of HARQ processes is greater than a threshold; and the transceiver unit 1801 is configured to send the indication data to the receiving device.

Optionally, in some possible implementations, the indication data is a broadcast message, and the transceiver unit 1801 is configured to send the broadcast message to the receiving device, where a value of a first preset bit in the broadcast message is a first preset value, and the first preset value is used to indicate the receiving device to disable the HARQ process.

Optionally, in some possible implementations, the indication data is first DCI.

Optionally, in some possible implementations, the transceiver unit 1801 is configured to send the first DCI to the receiving device, where a value of a second preset bit in the first DCI is a second preset value, and the second preset value is used to indicate the receiving device to disable the HARQ process.

Optionally, in some possible implementations, the transceiver unit 1801 is configured to send the first DCI to the receiving device, where a field length corresponding to the HARQ process in the first DCI is a preset length, and the preset length is used to indicate the receiving device to disable the HARQ process.

Optionally, in some possible implementations, the processing unit 1802 is further configured to scramble CRC data by using an RA-RNTI, to obtain scrambled CRC data; and the transceiver unit 1801 is configured to send the scrambled CRC data to the receiving device.

Optionally, in some possible implementations, the processing unit 1802 is configured to scramble data of a third preset bit in the CRC data by using the RA-RNTI, to obtain the scrambled CRC data.

Optionally, in some possible implementations, the processing unit 1802 is configured to process the RA-RNTI, to obtain offset data; and scramble the CRC data based on the offset data, to obtain the scrambled CRC data.

Optionally, in some possible implementations, the processing unit 1802 is configured to adjust a sequence of the RA-RNTI according to a preset rule, to obtain the offset data; add a preset offset value to the RA-RNTI, to obtain the offset data; or map the RA-RNTI according to a preset mapping rule, to obtain the offset data.

Optionally, in some possible implementations, the processing unit 1802 is further configured to generate second DCI based on reused data after the transceiver unit 1801 sends the indication data to the receiving device, where a fourth preset bit in the second DCI is reused data, and the fourth preset bit is a vacated bit after the HARQ process is disabled; and the transceiver unit 1801 is further configured to send the second DCI to the receiving device.

Optionally, in some possible implementations, the reused data may include at least one of over-the-top time of a satellite corresponding to the receiving device, a power adjustment step, an interleaving depth, and interruption duration of the satellite corresponding to the receiving device.

This application provides a chip system. The chip system includes a processor, configured to support a network device to implement functions in the foregoing aspects, for example, sending or processing data and/or information in the foregoing method. In a possible design, the chip system further includes a memory. The memory is configured to store necessary program instructions and data. The chip system may include a chip, or may include a chip and another discrete component.

In another possible design, when the chip system is a chip in a sending vice or a receiving device, the chip includes a processing unit and a communications unit. The processing unit may be, for example, a processor, and the communications unit may be, for example, an input/output interface, a pin, or a circuit. The processing unit may execute computer executable instructions stored in a storage unit, so that the chip in the sending device or the receiving device performs the steps of the method performed by the sending device or the receiving device in any one of the embodiments in FIG. 1a to FIG. 16b. Optionally, the storage unit is a storage unit in the chip, for example, a register or a buffer. Alternatively, the storage unit may be a storage unit in a terminal but outside the chip, for example, a read-only memory (ROM), another type of static storage device that can store static information and instructions, or a random access memory (RAM).

An embodiment of this application further provides a chip, including a processing module and a communications interface. The processing module can perform the method procedure related to the sending device or the receiving device in any one of the foregoing method embodiments.

Further, the chip may further include a storage module (for example, a memory). The storage module is configured to store instructions, and the processing module is configured to execute the instructions stored in the storage module, so that the processing module performs the method procedure related to the sending device or the receiving device in any one of the foregoing method embodiments.

An embodiment of this application further provides a communications system. The communications system may include at least one sending device and at least one receiving device. The sending device may be the sending device mentioned in any one of the embodiments in FIG. 1a to FIG. 18, and the receiving device may be the receiving device mentioned in any one of the embodiments in FIG. 1a to FIG. 18.

An embodiment of this application further provides a computer-readable storage medium. The computer-readable storage medium stores a computer program. When the program is executed by a computer, the method procedure related to the sending device or the receiving device in any one of the foregoing method embodiments is implemented. Correspondingly, the computer may be the sending device or the receiving device.

An embodiment of this application further provides a computer program or a computer program product including a computer program. When the computer program is executed by a computer, the computer is enabled to implement the method procedure related to the sending device or the receiving device in any one of the foregoing method embodiments. Correspondingly, the computer may be the sending device or the receiving device.

All or some of the foregoing embodiments in FIG. 5 to FIG. 16b may be implemented by using software, hardware, firmware, or a combination thereof. When software is used to implement the embodiments, all or some of the embodiments may be implemented in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that, the processor mentioned in the embodiments of this application may be a central processing unit (CPU), another general-purpose processor, a digital signal processor (DSP), an application-specific integrated circuit (ASIC), a field programmable gate array (FPGA) or another programmable logic device, discrete gate or transistor logic device, discrete hardware component, or the like. The general-purpose processor may be a microprocessor, or the processor may be any conventional processor or the like.

It should be further understood that there may be one or more processors in this application. Adjustment may be performed based on an actual application scenario. This is merely an example for description, and is not limited herein. There may be one or more memories in this embodiment of this application. Adjustment may be performed based on an actual application scenario. This is merely an example for description, and is not limited.

It should be further noted that when the sending device or the receiving device both include a processor (or a processing module) and a memory, the processor in this application may be integrated with the memory, or the processor may be connected to the memory by using an interface. Adjustment may be performed based on an actual application scenario. This is not limited.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or another network device) to perform all or some of the steps of the methods described in the embodiments in FIG. 5 to FIG. 16b of this application. The foregoing storage medium includes any medium that can store program code, such as a USB flash drive, a removable hard disk, a read-only memory (ROM), a random access memory (RAM), a magnetic disk, or an optical disc.

It may be understood that the memory in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory described in this specification aims to include but is not limited to these memories and any memory of another proper type.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
 receiving, by a receiving device, indication data, wherein the indication data indicates to disable a hybrid automatic repeat request (HARQ) process; and
 disabling, by the receiving device, the HARQ process, wherein the indication data comprises a first downlink control information (DCI), and wherein the disabling the HARQ process comprises:
  determining, by the receiving device, whether the first DCI meets a first preset condition; and
  disabling, by the receiving device, the HARQ process in response to the first DCI meeting the first preset condition, wherein the determining whether the first DCI meets the first preset condition comprises:
   reading, by the receiving device, a second preset bit in the first DCI; and
   determining, by the receiving device, that the first DCI meets the first preset condition in response to the receiving device determining that the second preset bit is a second preset value.

2. The method according to claim 1, wherein the indication data comprises a network identifier number; and
 wherein the disabling the HARQ process comprises:
  determining, by the receiving device based on a preset mapping relationship, that the network identifier number indicates to disable the HARQ process; and
  disabling, by the receiving device, the HARQ process.

3. The method according to claim 1, wherein the indication data comprises a broadcast message; and wherein the disabling the HARQ process comprises:
disabling, by the receiving device, the HARQ process in response to the receiving device determining that a value of a first preset bit in the broadcast message is a first preset value.

4. The method according to claim 1, wherein the determining whether the first DCI meets the first preset condition comprises:
obtaining, by the receiving device, a field length corresponding to the HARQ process in the first DCI; and
determining, by the receiving device, that the first DCI meets the first preset condition in response to the field length being a preset length.

5. The method according to claim 1, wherein the indication data comprises cyclic redundancy check (CRC) data; and
wherein the disabling the HARQ process comprises:
obtaining, by the receiving device, a descrambling result indicating a result of descrambling the CRC data based on a random access radio network temporary identifier (RA-RNTI); and
disabling, by the receiving device, the HARQ process in response to the descrambling result indicating that the descrambling succeeds.

6. The method according to claim 5, wherein the obtaining the descrambling result by descrambling the CRC data comprises:
obtaining the descrambling result indicating the result of descrambling, by the receiving device, data of a third preset bit in the CRC data by using the RA-RNTI.

7. The method according to claim 5, wherein the obtaining the descrambling result indicating a result of descrambling the CRC data comprises:
processing, by the receiving device, the RA-RNTI, to obtain offset data; and
obtaining the descrambling result indicating the result of the descrambling, by the receiving device, the CRC data based on the offset data.

8. The method according to claim 1, wherein the second preset bit is in a HARQ-related field of at least 4 bits.

9. A method, comprising:
obtaining, by a sending device, hybrid automatic repeat request (HARQ) process information corresponding to a receiving device; and
sending, by the sending device, indication data to the receiving device in response to the sending device determining that the HARQ process information meets a second preset condition, wherein the indication data indicates to disable a HARQ process, wherein the indication data comprises a first downlink control information (DCI), and wherein the sending the indication data comprises:
sending, by the sending device, the first DCI to the receiving device, wherein a value of a second preset bit in the first DCI is a second preset value, and wherein the second preset value indicates to the receiving device to disable the HARQ process.

10. The method according to claim 9, wherein the sending the indication data to the receiving device comprises:
determining, by the sending device, that the HARQ process information meets the second preset condition in response to the sending device determining that a quantity of HARQ processes is greater than a threshold; and
sending, by the sending device, the indication data to the receiving device.

11. The method according to claim 9, wherein the indication data includes a broadcast message; and
wherein the sending the indication data to the receiving device comprises:
sending, by the sending device, the broadcast message to the receiving device, wherein a value of a first preset bit in the broadcast message is a first preset value, and wherein the first preset value indicates to the receiving device to disable the HARQ process.

12. The method according to claim 9, wherein the sending the indication data to the receiving device comprises:
sending, by the sending device, the first DCI to the receiving device, wherein a field length corresponding to the HARQ process in the first DCI is a preset length, and wherein the preset length indicates to the receiving device to disable the HARQ process.

13. The method according to claim 9, wherein the sending the indication data to the receiving device comprises:
obtaining, by the sending device, scrambled CRC data by scrambling cyclic redundancy check (CRC) data by using random access radio network temporary identifier (RA-RNTI); and
sending, by the sending device, the scrambled CRC data to the receiving device.

14. The method according to claim 13, wherein the obtaining the scrambled CRC data by scrambling the CRC data by using the RA-RNTI comprises:
obtaining, by the sending device, the scrambled CRC data by scrambling data of a third preset bit in the CRC data by using the RA-RNTI.

15. The method according to claim 13, wherein the obtaining the scrambled CRC data by scrambling the CRC data by using the RA-RNTI comprises:
obtaining, by the sending device, offset data by processing the RA-RNTI; and
obtaining, by the sending device, the scrambled CRC data by scrambling the CRC data based on the offset data.

16. A communications apparatus, comprising:
at least one processor; and
a non-transitory computer readable memory storing a program for execution by the at least one processor, the program including instructions to cause the communications apparatus to perform operations including:
receiving indication data, wherein the indication data indicates to disable a hybrid automatic repeat request (HARQ) process; and
disabling the HARQ process,
wherein the indication data comprises a first downlink control information (DCI), and wherein the disabling the HARQ process comprises:
determining whether the first DCI meets a first preset condition; and
disabling the HARQ process in response to the first DCI meeting the first preset condition, wherein the determining whether the first DCI meets the first preset condition comprises:
reading a second preset bit in the first DCI; and
determining that the first DCI meets the first preset condition in response to determining that the second preset bit is a second preset value.

17. The communications apparatus according to claim 16, wherein the communications apparatus is a chip or a system-on-a-chip.

* * * * *